(12) United States Patent
Anschutz et al.

(10) Patent No.: US 10,612,356 B2
(45) Date of Patent: Apr. 7, 2020

(54) FRACTURE FLUID AND PROPPANT TRANSPORT TESTING SYSTEMS AND METHODS OF USING SAME

(71) Applicant: PropTester, Inc., Cypress, TX (US)

(72) Inventors: Donald A. Anschutz, Huffman, TX (US); Ian J. Renkes, Spring, TX (US); Kimberly Schill, The Woodlands, TX (US)

(73) Assignee: PropTester, Inc., Cypress, TX (US)

( * ) Notice: Subject to any disclaimer, the term of this patent is extended or adjusted under 35 U.S.C. 154(b) by 124 days.

(21) Appl. No.: 15/447,025

(22) Filed: Mar. 1, 2017

(65) Prior Publication Data

US 2018/0252627 A1    Sep. 6, 2018

(51) Int. Cl.
*E21B 43/267*    (2006.01)

(52) U.S. Cl.
CPC .................. *E21B 43/267* (2013.01)

(58) Field of Classification Search
CPC .......... E21B 43/267; E21B 49/10; G01N 1/20
USPC .......... 175/40, 48; 166/250.01, 250.1, 252.1, 166/259, 272.2, 272, 280.1, 280.2, 281, 166/283, 308.1–308.6; 73/152.01, 73/152.54, 863.71–863.73, 865.6, 865.9, 73/61.41, 61.62–61.75, 61.46
See application file for complete search history.

(56) References Cited

U.S. PATENT DOCUMENTS

| | | | |
|---|---|---|---|
| 4,606,227 A | 8/1986 | Walters | |
| 4,712,434 A * | 12/1987 | Herwig | ................ G01N 1/2035 73/863.71 |
| 4,726,219 A | 2/1988 | Pearson et al. | |
| 4,823,622 A * | 4/1989 | Nohl | ........................ G01N 1/28 73/863.71 |

(Continued)

FOREIGN PATENT DOCUMENTS

| CN | 102979516 A | 3/2013 |
|---|---|---|
| CN | 103726837 A | 4/2014 |

(Continued)

OTHER PUBLICATIONS

Anschutz et al., "Fluid Flow Testing Apparatus and Methods", U.S. Appl. No. 15/878,168, filed Jan. 23, 2018, 119 pgs.

(Continued)

*Primary Examiner* — Robert R Raevis
(74) *Attorney, Agent, or Firm* — Egan Peterman Enders Huston

(57) ABSTRACT

Methods and systems are disclosed that may be used for laboratory evaluation of the effectiveness of fluids and/or proppants such as those for hydraulic fracturing of oil and gas wells using a test system network. A test system network may include a reconfigurable network of conductor segments that may be arranged to simulate a fracture network matrix that exists downhole within an underground formation during a hydraulic fracturing treatment. Test fluids, including proppant-less as well as proppant-laden test fluids, may be flowed through the conductor segment network of a (Continued)

test system to measure, among other things, fluid and/or proppant distribution and proppant volume (or mass) during and after treatment within various parts of the test system network after the proppant is transported into the network by the introduced test fluid/s.

33 Claims, 11 Drawing Sheets

(56) References Cited

U.S. PATENT DOCUMENTS

| | | | | |
|---|---|---|---|---|
| 5,116,330 | A | * | 5/1992 | Spencer ............... G01N 1/2035 73/863.71 |
| 5,251,495 | A | * | 10/1993 | Kuhner ............... G01N 1/2035 73/863.71 |
| 5,309,761 | A | | 5/1994 | Ravi et al. |
| 5,361,631 | A | | 11/1994 | Covington et al. |
| 5,488,224 | A | | 1/1996 | Fagan et al. |
| 5,594,182 | A | * | 1/1997 | Jansen ..................... G01N 1/10 73/863.71 |
| 5,600,075 | A | * | 2/1997 | Peterson ................. G01N 1/22 73/863.71 |
| 6,023,656 | A | | 2/2000 | Cacas et al. |
| 6,055,874 | A | | 5/2000 | Onan et al. |
| 7,121,156 | B2 | | 10/2006 | Anschutz et al. |
| 7,325,608 | B2 | | 2/2008 | Van Batenburg et al. |
| 7,392,842 | B2 | | 7/2008 | Morgan et al. |
| 7,825,659 | B2 | | 11/2010 | Georgi et al. |
| 7,832,257 | B2 | | 11/2010 | Weightman et al. |
| 7,900,504 | B2 | | 3/2011 | Huynh et al. |
| 7,918,277 | B2 | | 4/2011 | Brannon et al. |
| 8,024,962 | B2 | | 9/2011 | Tonumkayakul et al. |
| 8,062,998 | B2 | | 11/2011 | Fulton et al. |
| 8,286,514 | B2 | | 10/2012 | Anschutz et al. |
| 8,352,227 | B2 | | 1/2013 | Klumpen et al. |
| 8,386,226 | B2 | | 2/2013 | Craig |
| 8,474,313 | B2 | | 7/2013 | Al Dhafeeri et al. |
| 8,573,048 | B2 | | 11/2013 | Slater et al. |
| 8,904,853 | B2 | | 12/2014 | Reyes et al. |
| 8,954,281 | B2 | | 2/2015 | Huynh et al. |
| 9,322,259 | B2 | | 4/2016 | Kulathu et al. |
| 9,341,556 | B2 | | 5/2016 | Jamison et al. |
| 9,377,392 | B2 | | 6/2016 | Rickards et al. |
| 9,587,490 | B2 | | 3/2017 | Kaarigstad et al. |
| 9,732,592 | B2 | | 8/2017 | Carvajal et al. |
| 9,733,192 | B2 | | 8/2017 | Shampine |
| 2006/0196254 | A1 | * | 9/2006 | Fjerdingstad ...... G01N 15/0227 73/64.56 |
| 2009/0306898 | A1 | | 12/2009 | Anschutz et al. |
| 2012/0043080 | A1 | * | 2/2012 | Edwards ................ E21B 43/26 166/264 |
| 2012/0156787 | A1 | | 6/2012 | Abass et al. |
| 2013/0233545 | A1 | | 9/2013 | Mahoney et al. |
| 2014/0076543 | A1 | | 3/2014 | Ejofodomi et al. |
| 2014/0290937 | A1 | | 10/2014 | Crews et al. |
| 2015/0060058 | A1 | | 3/2015 | Morris |
| 2015/0107829 | A1 | | 4/2015 | Themig |
| 2015/0275639 | A1 | | 10/2015 | Wang et al. |
| 2016/0145976 | A1 | | 5/2016 | Walters et al. |

FOREIGN PATENT DOCUMENTS

| | | |
|---|---|---|
| EP | 1996792 | 12/2011 |
| EP | 2924471 | 9/2015 |
| RU | 2625980 | 9/2016 |
| WO | WO2010/130037 A1 | 11/2010 |
| WO | WO2013/126287 A1 | 8/2013 |
| WO | WO2015/030837 A1 | 3/2015 |

OTHER PUBLICATIONS

Viswanathan et al, "Integrated Experimental and Computational Study of Hydraulic Fracturing and the User of Alternative Fracking Fluids", ARMA 15-248, Rock Mechanics/Geomechanics Symposium, 2015, 6 pgs.
Woodworth et al, "Extrapolation of Laboratory Proppant Placement Behavior to the Field in Slickwater Fracturing Applications", SPE-106089, Society of Petroleum Engineers, 2007, 12 pgs.
Barree et al., "Experimental and Numerical Modeling of Convective Proppant Transport", SPE-28564, SPE Annual Technical Conference and Exhibition, 1994, 16 pgs.
Sahai et al., "Laboratory Evaluation Of Proppant Transport in Complex Fracture Systems", Master of Science Petroleum Engineering Thesis Proposal, Colorado School of Mines, 2011, 20 pgs.
Zhang et al., "Numerical Analysis on the Optimization of Hydraulic Fracture Networks", Energies, vol. 8, 2015, 19 pgs.
Loveless et al., "Fracturing Fluid Comprised of Components Sourced Solely From the Food Industry Provides Superior Proppant Transport", SPC 147206, 2011, 8 pgs.
Hodge, "EPA HF Study Technical Workshop: Chemical and Analytical Methods; Crosslinked and Linear Gel Composition", available on the Internet prior to the Mar. 1, 2017 filing date of the current patent application, 11 pgs.
International Standard ISO13503-5, "Petroleum and Natural Gas Industries, Completion Fluids and Materials", Part 5: Procedures for Measuring the Long Term Conductivity of Proppants, Jul. 1, 2006, 32 pgs.
Chemical Engineering Series, Unit Operations of Chemical Engineering, Third Edition, Chapter 26, Properties and Handling of Particulate Solids, 1976, 17 pgs.
American Petroleum Institute, "Measuring the Long Term Conductivity of Proppants", ANSI/API Recommended Practice 19D; Reaffirmed May 2015, 36 pgs.
American Petroleum Institute, "Measurement of Properties of Proppants Used in Hydraulic Fracturing and Gravel-Packing Operations", ANSI/API Recommended Practice 19C, Reaffirmed Jun. 2016, 41 pgs.
Brannon et al., "Large Scale Laboratory Investigation of the Effects of Proppant and Fracturing Fluid Properties on Transport", SPE-98005, 2006, 13 pgs.
Fischer et al., "Practical laboratory Testing for Shale Fracturing", SPE-168201, 2014, 13 pgs.
Sahai et al., "Laboratory Results of Proppant Transport in Complex Fracture Systems", SPE-168579, 2014, 26 pgs.

* cited by examiner

FRACTURE FLUID AND PROPPANT TRANSPORT TESTING SYSTEMS AND METHODS OF USING SAME

FIELD

This invention relates generally to systems and methods for evaluating fluid and proppant transport behavior within an underground formation.

BACKGROUND

Hydrocarbon production from shale formations is accomplished through natural formation fractures that are in communication with the producing wellbore. Stimulation treatments, such as hydraulic fracturing, are often performed on a shale formation to maximize contact and connectivity with the shale's natural fractured system to enhance productivity. During a hydraulic fracturing treatment, a fracturing fluid containing proppant is introduced into an underground formation through perforations in the wellbore at flow rates and pressures sufficient to fracture the formation and transport the proppant into the formation.

SUMMARY

Disclosed herein are methods and testing systems that may be employed to simulate fluid and proppant transport through different segments of a fracture network created in an underground formation during a hydraulic fracturing treatment introduced through a wellbore. In one embodiment, the disclosed systems and methods may be used for laboratory evaluation of the effectiveness of fluids and/or proppants such as those for hydraulic fracturing of oil and gas wells by employing a reconfigurable network of conductor segments that may be arranged to simulate or model an actual fracture matrix that exists downhole within an underground formation during a hydraulic fracturing treatment. Example types of testing include flowing test fluids may have constituents that include mixtures of viscosified and/or non-viscosified fluids (e.g., liquids) mixed with proppants through the network or matrix of a test system to measure proppant distribution and volume (or mass) during and after treatment within various parts of the simulated fracture network after the proppant is transported into the network by the introduced fluid/s. Also possible is testing that includes flowing test fluids (e.g., viscosified and/or non-viscosified fluids or liquids) without proppant through the network or matrix of a test system. In either case, dynamic parameters such as fluid flow, viscosity and/or pressure drop may be measured in various parts of the simulated fracture network while a fluid is transported (with or without proppant) through the network.

In one embodiment, a fluid and/or proppant transport testing system may be provided that includes a network of different fluid conductor segments that are coupled together in fluid communication to model multiple connected fractures of a fracture network or matrix, e.g., such as a network of induced and/or natural fractures that may exist in an underground formation during a hydraulic fracturing treatment. In one embodiment, conductor segments of the conductor network may extend in any direction (e.g., vertically, horizontally and/or any other direction) relative to gravity. This advantageously allows simulation of fracture segments that are oriented to extend in any direction (e.g., vertically, horizontally and/or any other direction) from an intersecting wellbore into an underground formation. In a further embodiment, fracture angles may be replicated in different sizes and directions using a conductor network that incudes different sized conductor segments that may be oriented in different directions.

In one embodiment, a proppant-laden fluid slurry may be introduced (e.g., pumped under pressure) into the testing system and passed through the conductor network during a proppant transport testing procedure. Dynamic flow of fluid and distribution of proppant within the various conductor segments of the network may be visually observed and/or otherwise monitored (e.g., using one or more sensors such as pressure sensors, density sensors, photoelectric sensors, temperature sensors, spectral sensors or spectrometers, radiation detectors, fluid and/or proppant velocity sensors, viscosity sensors, video cameras, electrical resistivity sensors, etc.) while the proppant-laden fluid slurry is being introduced into the test system and/or is settling after pumping has been stopped. Such a testing procedure may be employed to take into account the forces necessary to lift, or drop, proppant into each upward or downward fracture branch. Such testing may also be used to show how the tested fluid and proppant slurry would flow through each fracture branch, and the pressure increase required across each fracture segment or branch that would allow additional fractures to open. In another embodiment a proppant-less fluid may be similarly introduced into the testing system and passed through the conductor network during which dynamic flow of fluid within the various conductor segments of the network may be visually observed and/or otherwise monitored, e.g., using one or more sensors while the fluid slurry is being introduced into the test system.

After fluid introduction ceases, static distribution and settling of the proppant within the different conductor segments may be visually observed and/or otherwise monitored in a manner similar to dynamic conditions. After the fluid and proppant are pumped through the test system network, volume or mass of proppant that is left in each of the branches or conductor segments after being transported by the fluid may be measured. In one embodiment, one or more conductor segments of the network may be removed from the conductor network after fluid introduction ceases (e.g., by uncoupling the conductor segments from each other) so that the fluid and/or proppant contents of each removed segment may be analyzed.

Examples of such analyses include, but are not limited to sieve analysis to determine particle size distribution of proppant deposited in a particular conductor segment of the conductor network, density measurements to determine density of proppant deposited in a particular conductor segment of the conductor network, conductivity testing on deposited proppant in the conductor segment, as well as full evaluation according to API RP 19C ("Recommended Practice for Measurement of Proppants Used in Hydraulic Fracturing and Gravel-packing Operations") and/or according to API RP 19D ("Recommended Practice for Measuring the Long-term Conductivity of Proppants") as well as International Organization for Standardization (ISO) conductivity cell and ISO procedures 13503-5:2006E entitled "Procedures for Measuring the Long Term Conductivity of Proppants". In one exemplary embodiment, one or more conductor segments may be configured to allow direct in-situ testing of proppant and/or fluid contents remaining inside the conductor segment after removal of the conductor segment from the network following fluid introduction, e.g., by flowing fluid under pressure through the length of a removed conductor segment and measuring pressure drop across its contents, etc. It is further possible that a given conductor segment may be configured with one or more valves (e.g., check valves, ball valves, etc.) to isolate and contain the contents of the conductor segment within the segment when it is removed from the conductor network for analysis.

In one embodiment, proppant transport testing and analysis may be employed to better understand proppant behavior in an underground formation by evaluating factors such as propped facture conductivity, distribution of proppant into primary and subsidiary fractures (e.g., primary, secondary, tertiary, etc. fractures) and other fracture characteristics for different combinations of treatment fluids, treatment volumes, proppant sizes, etc. Fracture treatment effectiveness and other characteristics of different types of fracture treatment designs may be evaluated in a given type of formation rock based on a simulated facture network system that is configured to represent the characteristics of the given type of formation rock. In this regard, different types of fracture treatment designs (e.g., having different proppant types and/or sizes, different combinations of proppant sizes/types, different number of fracture treatment stages and volumes of fracture treatment stages, different relative fluid pumping rates, etc.) may be evaluated for treatment of a given type of underground formation and completion in a laboratory environment. The results of such testing and analysis may be employed, for example, to maximize the effectiveness of fracture treatment technology and/or reduce fracture treatment costs for a given formation type.

In one respect, disclosed herein is a test system, including: a network of multiple conductor segments coupled together in fluid communication, the network having at least one fluid inlet and multiple fluid outlets; and at least two spaced valves coupled inline within at least one of the multiple conductor segments to define a sample chamber between the two valves within the at least one conductor segment; where the at least one conductor segment is detachable from fluid communication with the other conductor segments.

In another respect, disclosed herein is a method, including: introducing a test fluid into at least one fluid inlet of a network of multiple conductor segments coupled together in fluid communication, the test fluid including one or more constituents; causing the test fluid to flow through the multiple conductor segments from the fluid inlet to multiple fluid outlets of the network to distribute one or more of the constituents of the test fluid within the multiple conductor segments; isolating contents of a sample chamber defined within at least one of the multiple conductor segments, the isolated contents including distributed test fluid constituents; detaching the at least one conductor segment from fluid communication with the other conductor segments, the detached conductor segment including the sample chamber containing the isolated contents; and removing the isolated contents from the sample chamber of the detached conductor segment.

In another respect, disclosed herein is a test system sub-assembly, including: an inlet manifold and an outlet manifold; and multiple conductor segments coupled together in adjacent and parallel side-by-side relationship within the same plane between the inlet manifold and the outlet manifold. In one embodiment, each of the multiple conductor elements may be a cylindrical conductor having an internal diameter that is the same or different from the internal diameters of the other multiple conductor elements of the test sub-assembly.

DESCRIPTION OF ILLUSTRATIVE EMBODIMENTS

Figure 1A:
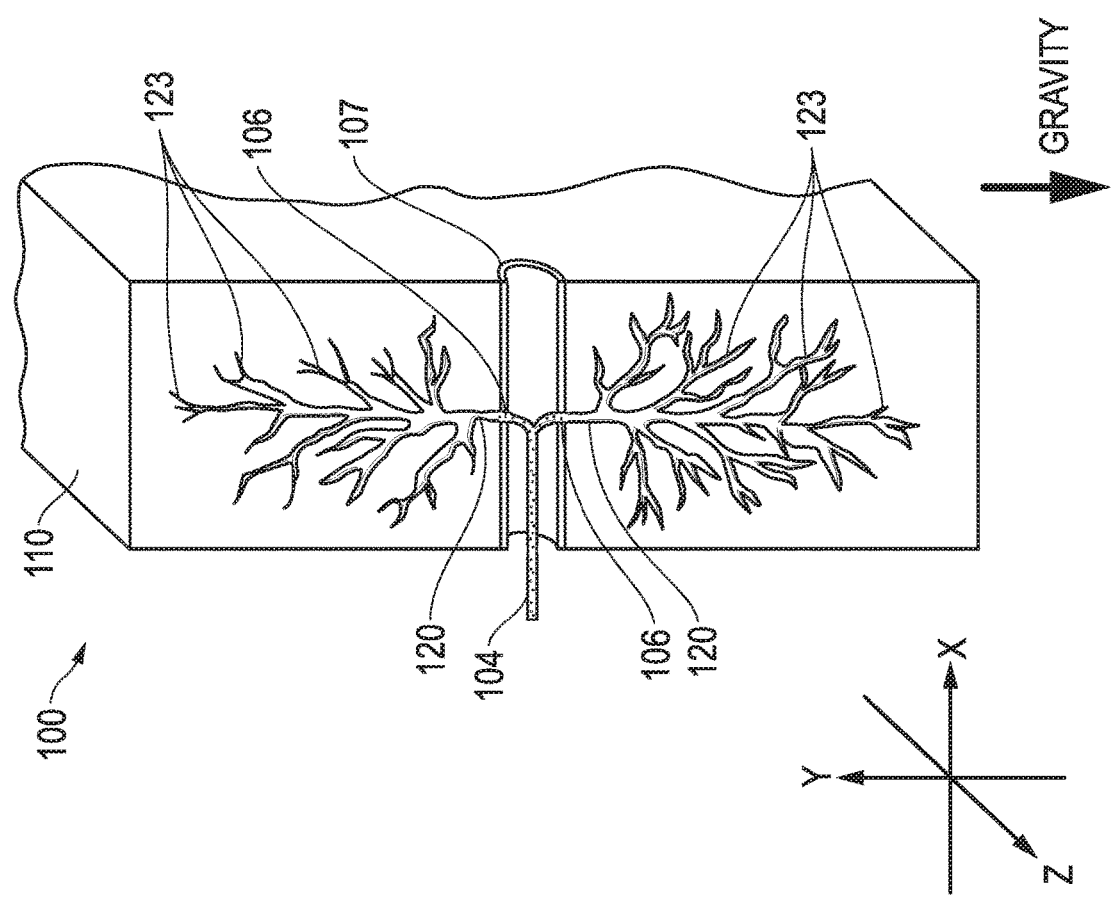
FIG. 1A illustrates a cross-sectional representation of an example underground formation.

FIG. 1A illustrates a cross-sectional representation of an example underground formation 100. Formation 100 may be, for example, a low permeability formation such as shale formation, limestone formation, tight sandstone, any other type or permeability of hydrocarbon-containing formation, etc. As shown in FIG. 1, formation 100 includes formation material 110 that is penetrated by a horizontal wellbore 107 through which a proppant-laden fracture fluid 104 is being introduced into formation 100 via perforations 106 of a given perforation cluster (i.e., an interval of multiple perforations extending through a casing of wellbore 107) during a hydraulic fracturing treatment. Although a single perforation cluster is illustrated, it will be understood that multiple spaced perforation clusters may be provided at different depths within a given completion interval that is hydraulically fractured. Proppant-laden fracture fluid 104 may be any suitable fluid for transporting proppant (e.g., frac sand, sintered bauxite, ceramic proppant, resin coated proppant, etc.) into formation 100. Examples of such fluids include, but are not limited to, slickwater fluid, linear gel fluid, crosslinked fluid, etc.

As shown in FIG. 1A, formation section 100 includes a formation material 110 having a fracture network contained therein that includes interconnected primary fracture segments 120 and subsidiary fracture segments 123 (e.g., secondary fracture segments, tertiary fracture segments, etc.). In FIG. 1, each of primary fracture segments 120 are shown extending upwards and downwards (e.g., along the y-axis) from horizontal wellbore 107 that extends parallel to the x-axis, and in this case are induced by flow of fracture fluid 104 into formation 100. Other primary fracture segments 120 not visible in FIG. 1A may extend sideways (e.g., along the z-axis into and/or out from the page) from horizontal wellbore 107, and/or may extend (or flow toward least resistance) at any other direction in three dimensions from horizontal wellbore 107, e.g., at a variety of angles to the x, y and/or z axes. In this regard, a given fracture segment may extend from a wellbore in a direction oriented perpendicular to the least principal stress of the formation. Subsidiary fractures 123 may be induced and/or may be natural facture segments that extend in variety of directions in three dimensions from primary fractures 120, and that are connected in fluid communication with primary fractures 120 (or that may become connected in fluid communication with primary fractures 120 due to introduced fluid pressure from primary fractures 120 that breaks down debris or other barriers to flow) to receive the introduced fracture fluid and proppant. During the hydraulic fracturing treatment, the proppant introduced by fracture fluid 104 is deposited within the fractures 120 and 123, where it remains in situ following the treatment to "prop" open fractures 120 and/or 123 and to enhance fracture conductivity (e.g., product of the fracture width and the proppant permeability) during subsequent production or injection operations. Effectiveness of the fracture treatment fluid and deposited proppant depends on many factors, including how effectively the proppant is transported upwards (i.e., against gravity) and downwards into the primary fracture segments 120 to create a continuous pack throughout the interconnected subsidiary fracture segments 123, percentage of connected open fracture cross-sectional area filled by the deposited proppant, permeability of the deposited proppant within the fracture segments 120 and 123, segregation of proppant within the facture network, resulting conductivity at different intervals (e.g., different facture segments) within the fracture network, etc.

Figure 1B:
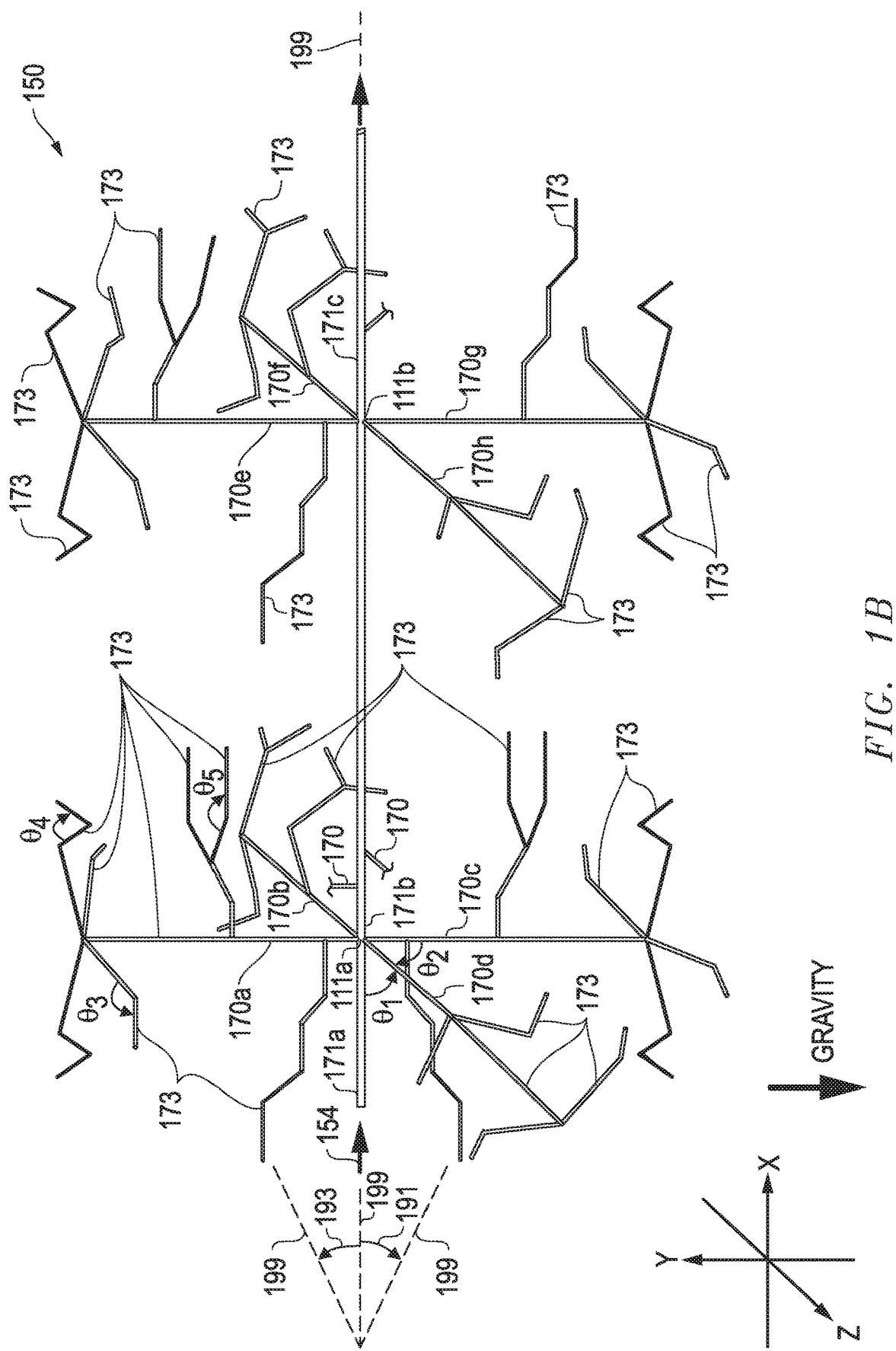
FIG. 1B illustrates a simplified perspective view of a test system architecture according to one exemplary embodiment of the disclosed methods and systems.

FIG. 1B illustrates a simplified perspective view of a three-dimensional test system architecture 150 as it may be configured according to one exemplary embodiment of the disclosed systems and methods. As shown in FIG. 1B, test system architecture 150 may be configured to evaluate fluid flow and/or proppant transport and resulting effectiveness of a hydraulic facture treatment on an underground formation such as formation 100 of FIG. 1A. As shown, test system architecture 150 of this embodiment includes a three-dimensional network or matrix of multiple interconnected fluid conductor segments 171a, 171b, 170 and 173 as they may be oriented to extend in three-dimensions (x, y and z axes), and configured for receiving an introduced proppant-laden test fracture fluid 154. As used herein, the x-axis is chosen to represent the horizontal axis direction, the y-axis is chosen to represent the vertical axis direction, and the z-axis is chosen to represent the axis direction that extends into and out of the page.

In one embodiment, particular configuration (size and geometry) of interconnected fluid conductor segments 171, 170 and 173 may be based on reservoir characterization and/or core samples of formation 100, and may be rearranged to model different formation conditions (e.g., such as natural fracture network conditions that are present in an underground shale formation). In this regard, relative lengths and sizes of interconnected fracture segments, angle of intersection between different fracture segments, presence and extent of subsidiary fracture segments (e.g. secondary fractures segments, tertiary fracture segments, quaternary fracture segments, etc.) and other observed formation characteristics from a formation core may be used to design and configure a test system architecture 150 to simulate actual formation and reservoir characteristics. Thus, the number of different sizes of fluid conductor segments 171, 170 and 173 of FIG. 1B is exemplary only, it being understood that more than three (or less than three) different sizes of fluid conductor segments may be provided as suitable or desired for a given underground formation and configuration of corresponding test system architecture.

In one exemplary embodiment, a first fraction of the multiple fluid conductor segments (e.g., 171, 170, 173, etc.) of a test system architecture 150 may be configured as desired to correspond to (e.g., simulate) natural fractures present within an actual underground formation 100, with a second fraction of fluid conductor segments (e.g., 171, 170, 173, etc.) being configured to correspond to fractures induced in the underground formation 100 during a hydraulic fracturing treatment to interconnect the first fraction of fluid conductor segments that correspond to the natural fractures. In a further embodiment, a majority of the fluid conductor segments may correspond to natural fractures, i.e., such that the first fraction of conductor segments corresponding to natural fractures is larger (e.g., greater than 50%) than the second fraction of conductor segments corresponding to induced fractures. In yet a further embodiment, at least a portion of the fluid conductor segments may be provided as desired with an internal roughness that is different from the internal roughness of the other fluid conductor segments, e.g., in order to simulate internal surfaces of different types of fractures that induce different amounts of friction and/or different flow regimes for a proppant-less fracture fluid or a proppant-laden fracture fluid as it passes through the network. For example, those fluid conductor segments corresponding to natural fractures in formation 100 may be provided with a greater internal roughness (e.g., by virtue of internal scoring and/or raised or depressed features provided on internal surfaces of the fluid conductor segments) than those fluid conductor segments corresponding to induced fractures.

In this particular embodiment, test system architecture 150 incudes a horizontal input conductor segment 171 as it may be provided to correspond to a horizontal wellbore 107 of an actual well completion into an underground formation 100, or alternatively a main horizontal fracture segment within a formation. Upward and downward-extending primary conductor segments 170a and 170c may in one embodiment be coupled to horizontal conductor segment 171 in adjacent relationship to each other as shown to correspond to primary fracture segments 120 that extend upward and downward into a formation 100 from horizontal wellbore 104 at a first simulated perforation cluster 111a. Also illustrated are lateral or sideways-extending primary conductor segments 170b and 170d that may extend outwardly from the sides of horizontal input conductor segment 171 at simulated perforation cluster 111a, e.g., primary conductor segment 170d extending outward from the page in FIG. 1B and primary conductor segment 170b extending inward into the page in FIG. 1B. Although in the illustrated embodiment four primary conductor segments 170 extend from input conductor segment 171 at perforation cluster 111a, it will be understood that in other embodiments a given simulated perforation cluster 111 may include more or less than four primary conductor segments 170 extending from an input conductor segment 171, e.g., one primary conductor segment 170, two primary conductor segments, three primary conductors segments, more than four primary conductor segments, etc. Moreover, it is not necessary that adjacent primary conductor segments 170 be coupled to an input conductor segment in a position directly opposite from each other.

As illustrated in FIG. 1B a horizontal input section 171 may be provided in one embodiment that includes at least one first horizontal section 171a that separates the inlet of horizontal input section 171 from the first simulated perforation cluster 111a, as well as a second horizontal section 171b that separates the first simulated perforation cluster 111a from a second simulated perforation cluster 111b and a third horizontal section 111c that separates the second simulated perforation cluster 111b from additional simulated perforation clusters 111 that may be coupled together in a chain-like or repeating manner. In this regard, a test system architecture may include only a single perforation cluster 111, or may include two or more perforation clusters as needed or desired to fit characteristics of a given fracture modeling application, e.g., such as to simulate a wellbore 107 having multiple separate perforation clusters. As further shown, conductor segments 170 may also be coupled to one or more primary conductor segments 170 between perforation clusters 111. As illustrated, it is not necessary for primary conductor segments 170 to be symmetrically coupled to opposing sides of a horizontal conductor segment 171a/171b/171c, but rather may be coupled in any suitable number or orientation as desired or needed for a particular testing application.

As shown in FIG. 1B, fluid conductor segments 171, 170 and 173 may have different respective cross-sectional open areas perpendicular to fluid flow direction (e.g., corresponding to circular cross-sections having different diameters in the case of cylindrical tubing) as desired or needed to fit a given application. For example, in the illustrated embodiment, horizontal input conductor segment 171 may be cylindrical tubing having a larger diameter than cylindrical primary conductor segments 170, each of which in turn may have a larger diameter than coupled cylindrical subsidiary (e.g., secondary, tertiary, etc.) conductor segments 173. Such a progressively tapered relationship may have a relatively larger input conductor segment that is coupled to relatively smaller primary conductor segment/s, each of which may in turn be optionally coupled to one or more secondary conductor segments that are relatively smaller than the primary conductor segment, with each of the secondary primary conductor segments optionally being coupled to one or more tertiary conductor segments that are relatively smaller than the respective secondary conductor segment, and so on. In another embodiment, a continuously-tapered conductor segment may be employed that progressively tapers in diameter with its length without internal connections. However, it will be understood that in other embodiments, the interconnected conductor segments of a test system architecture do not need to be tapered relative to each other and/or may independent vary in size as desired or needed. Further, one or more of independent conductor segments 171, 170 and 173 may have a different length from each of the other conductor segments 171, 170 and 173 as desired or needed to fit a given application. In addition, a test system architecture such as described herein may be scaled-up in size and/or length.

In FIG. 1B, longitudinal axis 199 of input conductor segment 171 is illustrated as being oriented horizontal relative to gravity in FIG. 1B (i.e., having a longitudinal axis 199 oriented at 0 degrees from (or parallel to) the horizontal relative to gravity, or in other words parallel to the x-axis of FIG. 1B). However, it will be understood that the longitudinal axis of an input conductor segment may be alternatively oriented in other directions relative to the x, y and z axes of FIG. 1B and/or may be non-horizontal and oriented at any other angle or angles relative to gravity besides that shown. For example, longitudinal axis 199 of an input conductor segment may be alternatively oriented to slope upwards at any angle 193 that is from greater than 0 degrees up to 90 degrees from the horizontal relative to gravity (or the x-axis), e.g., in one embodiment to slope upwards at an angle 193 that is from greater than 0 degrees to about 45 degrees from the horizontal relative to gravity, in another embodiment to slope upwards at an angle 193 that is from greater than 0 degrees to about 20 degrees from the horizontal relative to gravity, and in another embodiment to slope upwards at an angle 193 that is from greater than 0 degrees to about 10 degrees from the horizontal relative to gravity. Alternatively, longitudinal axis 199 of an input conductor segment may be alternatively oriented to slope downwards at any angle 191 that is from greater than 0 degrees to 90 degrees from the horizontal relative to gravity (or the x-axis), e.g., in one embodiment to slope downwards at an angle 191 that is from greater than 0 degrees to about 45 degrees from the horizontal relative to gravity, in another embodiment to slope downwards at an angle 191 that is from greater than 0 degrees to about 20 degrees from the horizontal relative to gravity, and in another embodiment to slope downwards at an angle 191 that is from greater than 0 degrees to about 10 degrees from the horizontal relative to gravity.

Moreover it will be understood that an input conductor segment 171 may be non-linear, e.g., curved or otherwise changing its angle in two or three dimensions with length. It will also be understood that the number of primary conductor segments 170 that intersect and connect to an input conductor segment 171 may vary as desired, and/or that directional orientation of each primary conductor segment 170 and/or other subsidiary conductor segment (e.g., secondary or tertiary conductor segment 173, etc.) relative to any other intersecting conductor segment to which it is directly coupled in end-to-end relationship may also independently vary in magnitude of angle ($\theta$) and in direction (i.e., any selected combination of x, y and/or z directions) as desired.

For example, in FIG. 1B, the longitudinal axis of sideways-extending primary conductor segment 170d is shown oriented at an angle $\theta_1$ from the longitudinal axis of input conductor segment 171a to which it is directly coupled and also oriented at an angle $\theta_2$ from the longitudinal axis of input conductor segment 171a from the longitudinal axis of downward-extending primary conductor segment 170c to which it is also directly coupled. For purposes of illustration, several other conductor segments are shown in FIG. 1B that each have a longitudinal axis that extends at a different angle labelled $\theta_3$, $\theta_4$ or $\theta_5$ from the longitudinal axis of a respective single conductor segment to which it is directly coupled. In this regard, the value of $\theta$ between any two directly coupled conductor segments may independently vary in magnitude from the value of $\theta$ between any other two directly coupled conductor segments (e.g., in FIG. 1B the value of each of exemplary angles $\theta_1$, $\theta_2$, $\theta_3$, $\theta_4$ and $\theta_5$ may be different from each other).

In one embodiment, a value of $\theta$ between the longitudinal axis of any given conductor segment may independently vary from 0 degrees to 360 degrees from a longitudinal axis of another intersecting connected conductor segment to which it is directly coupled. In another embodiment, a value of $\theta$ between the longitudinal axis of any given conductor segment may independently vary from 0 degrees to less than 360 degrees from a longitudinal axis of another intersecting connected conductor segment to which it is directly coupled. In another embodiment, a value of $\theta$ between the longitudinal axis of any given conductor segment may independently vary from 0 degrees to less than 180 degrees from a longitudinal axis of another intersecting connected conductor segment to which it is directly coupled. In another embodiment, a value of θ between the longitudinal axis of any given conductor segment may independently vary from greater than 0 degrees to less than 180 degrees from a longitudinal axis of another intersecting connected conductor segment to which it is directly coupled.

Thus, connections may be provided that couple two conductor segments together at any desired angle, e.g., between 0 degrees and 360 degrees. Thus, configuration and orientation of conductor segments (e.g., such as conductor segments 171, 170 and 173 of FIG. 1B) in a proppant testing system conductor network may be designed and varied to correspond to the fracture characteristics of a given type of formation (e.g., based on characterized reservoir parameters for the formation such as average number of subsidiary fracture segments to primary fractures, average fracture segment intersection angle, average ratio of induced fracture segments to naturally-occurring fracture segments, etc.), or may be designed to fit any other desired (e.g., hypothetical) fracture network configuration.

Figure 2:
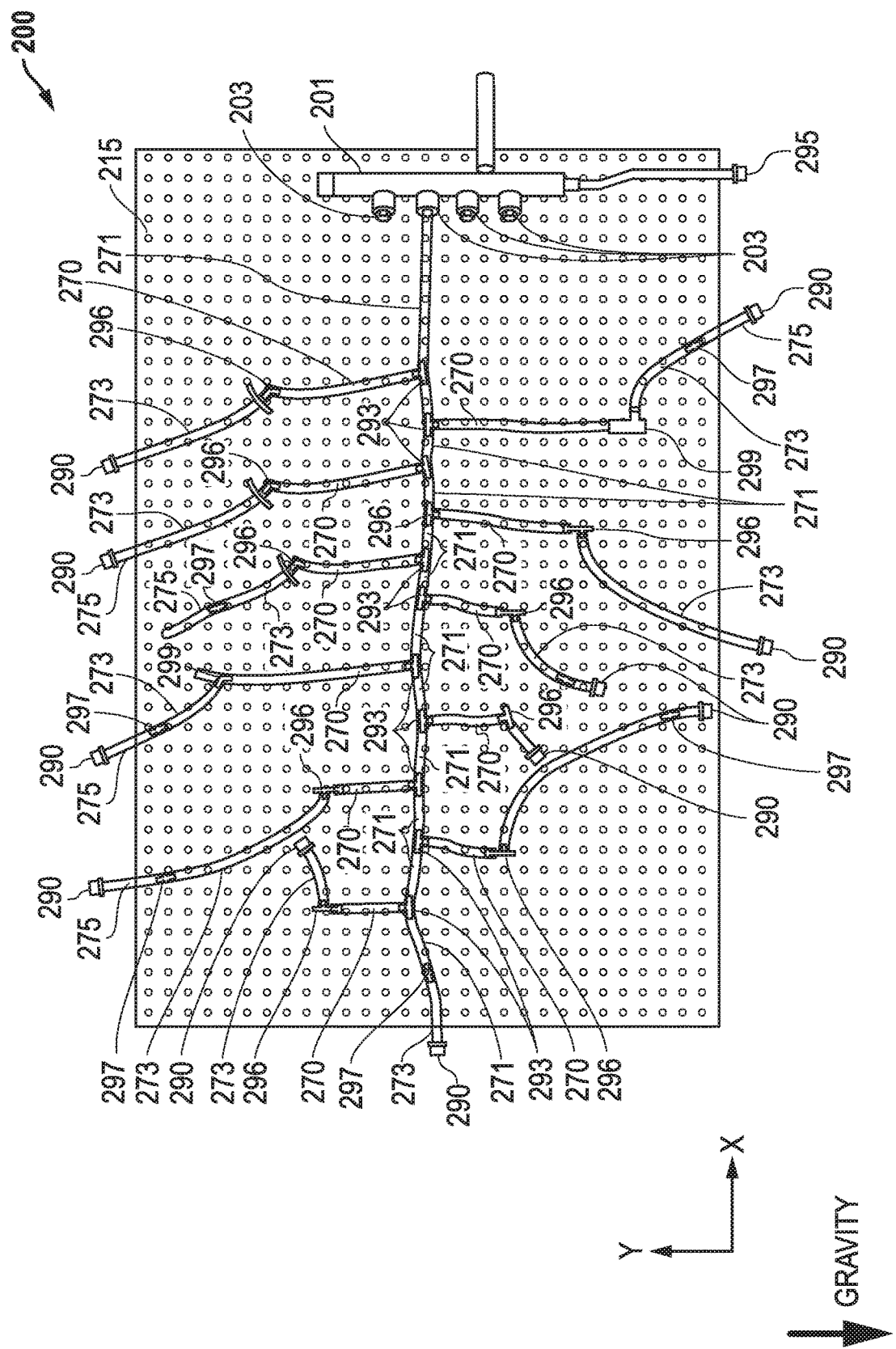
FIG. 2 illustrates a test system network according to one exemplary embodiment of the disclosed methods and systems.

FIG. 2 illustrates one exemplary embodiment of a two-dimensional test system network 200, e.g., as it may be constructed and used for testing in a laboratory or other test facility environment for fluid and/or proppant transport testing. In this embodiment, interconnected conductor segments 271, 270, 273 and 275 are coupled together by couplings 293, 296 and 297 in a substantially vertically-planar two-dimensional matrix relationship (e.g., laid out along horizontal x and vertical y axes as shown), e.g., suspended from a vertical planar supporting structure such as from pegboard 215 by clips such as to represent a slice of formation 100 of FIG. 1A. It is also possible that a two-dimensional test system network such as network 200 may be alternatively oriented in another plane besides a vertical plane, e.g., such as in a horizontal plane or in a plane angled anywhere between the horizontal and vertical. In one embodiment, each of conductor segments 271, 270 and 273 may be clear (transparent or translucent) and flexible cylindrical tubing segments, e.g., such as polyvinylchloride tubing, polyurethane tubing, polyethylene tubing, polyurethane tubing, fluoropolymer tubing, etc. In another exemplary embodiment, any other type of conduit that is suitable for allowing pressure and fluid/proppant flow may be employed, e.g., such as stainless steel, opaque plastics, etc. In the illustrated embodiment, each of conductor segments 271, 270 and 273 are of the same internal diameter, e.g., from about 0.25 inch to about one inch internal diameter, and in one case about 0.5 inch internal diameter, although conduits having an internal diameter larger than one inch and smaller than 0.25 inch are also possible.

As stated above, in the illustrated embodiment of FIG. 2, all of conductor segments 271, 270 and 273 have the same internal diameter, although in other embodiments the different types of conductor segments 271, 270 and 273 may each have a different internal diameter (e.g., diameter of cylindrical segments 271 greater than diameter of cylindrical segments 270, and diameter of cylindrical segments 270 greater than diameter of cylindrical segments 273). In this regard, test system network 200 may be configured as a modular system having interchangeable parts (e.g., valves, screens, filters, connectors, etc.) and interchangeable conduit sizes (e.g., of different internal diameters and/or lengths) so as to allow test system network 200 to be configured and reconfigured as desired to fit the fracture characteristics of a given application.

Each of segments 271, 270 and 273 may be coupled together, e.g., by connectors (e.g., fittings or unions), which in one embodiment may be plastic or metal screw connection unions 293, 296, 297 of suitable internal diameter and geometry to couple together the individual conductor segments 271, 270 and 273 to form a fluid and pressure-tight seal with the coupled conductor segments. In one exemplary embodiment, such connections may be full-opening, meaning that a given connection has an internal diameter or cross-sectional flow area as large as the internal diameter of the largest diameter or cross-sectional flow area conductor segment to which it is coupled. It will be understood that any given connector may optionally have a single inlet and multiple outlets to allow multiple conductor segments to be coupled to the multiple outlets. Other (e.g., specialized) connectors may be provided, e.g., such as connectors having an additional outlet (not connected to a conductor segment of the network) that is configured to be used as a leak-off port, pressure sensor port, etc. such as in a manner described further herein.

Still referring to FIG. 2, a substantially horizontal input section made up of interconnected conductor segments 271 is coupled to an optional manifold 201 that includes multiple outlets 203 that each may also be optionally coupled to multiple other input conductor segments (not shown) in similar manner. As shown, a fluid input 295 is provided that may be coupled to a pump for supplying a proppant-laden test fracture fluid 154 to the interconnected conductor segments of test system network 200. As shown, individual primary conductor segments 270 are coupled to extend upward or downward from substantially horizontal input conductor segments 271 by T-connectors 293 as shown, in this case at about 90 degrees upwards or downward from each T-connector 293 to simulate primary facture segments extending upward or downward from a horizontal wellbore, although other angles from greater than 0 degrees to less than 180 degrees are possible. In this embodiment, each of secondary conductive segments 273 is coupled to a corresponding primary conductor segment 270 by a respective angled (e.g., right angle or greater or lesser angle) connector 296 and then may be bent or otherwise oriented in a different direction at an angle between 0 and 90 degrees to the output of the corresponding angled connector 296 as shown, e.g., to simulate secondary fracture segments extending outwardly at a variety of different angles from the side of a primary facture. It will be understood that it is also possible that one or more individual segments 271 of a substantially horizontal section and/or primary conductor segments 270 may also be bent or otherwise oriented at an angle between 0 and 90 degrees relative to the substantially horizontal segments 271 of the input section. As shown, additional conductor segments may be similarly coupled as tertiary conductor segments 275 as shown to the end of one or more of the secondary conductor segments 273 (e.g., in this case via an in-line or linear coupling 297), and that any number of further conductor segments may be coupled to the end of each tertiary conductor segment via angled and/or linear connectors in similar manner.

Also shown present in the embodiment of FIG. 2 are optional screw connectors 299 that may be present for purposes of varying the design (e.g., geometry) and size of the conduits to fit the given conception of the fracture network In this embodiment, the end of a substantially horizontal input section (i.e., made up of individual conductor segments 271), as well as each of secondary conductor segments 273 or tertiary conductor segments 275, is coupled to a screen filter 290 through which introduced fluid may exit without its proppant constituent/s during testing.

Figure 3A:
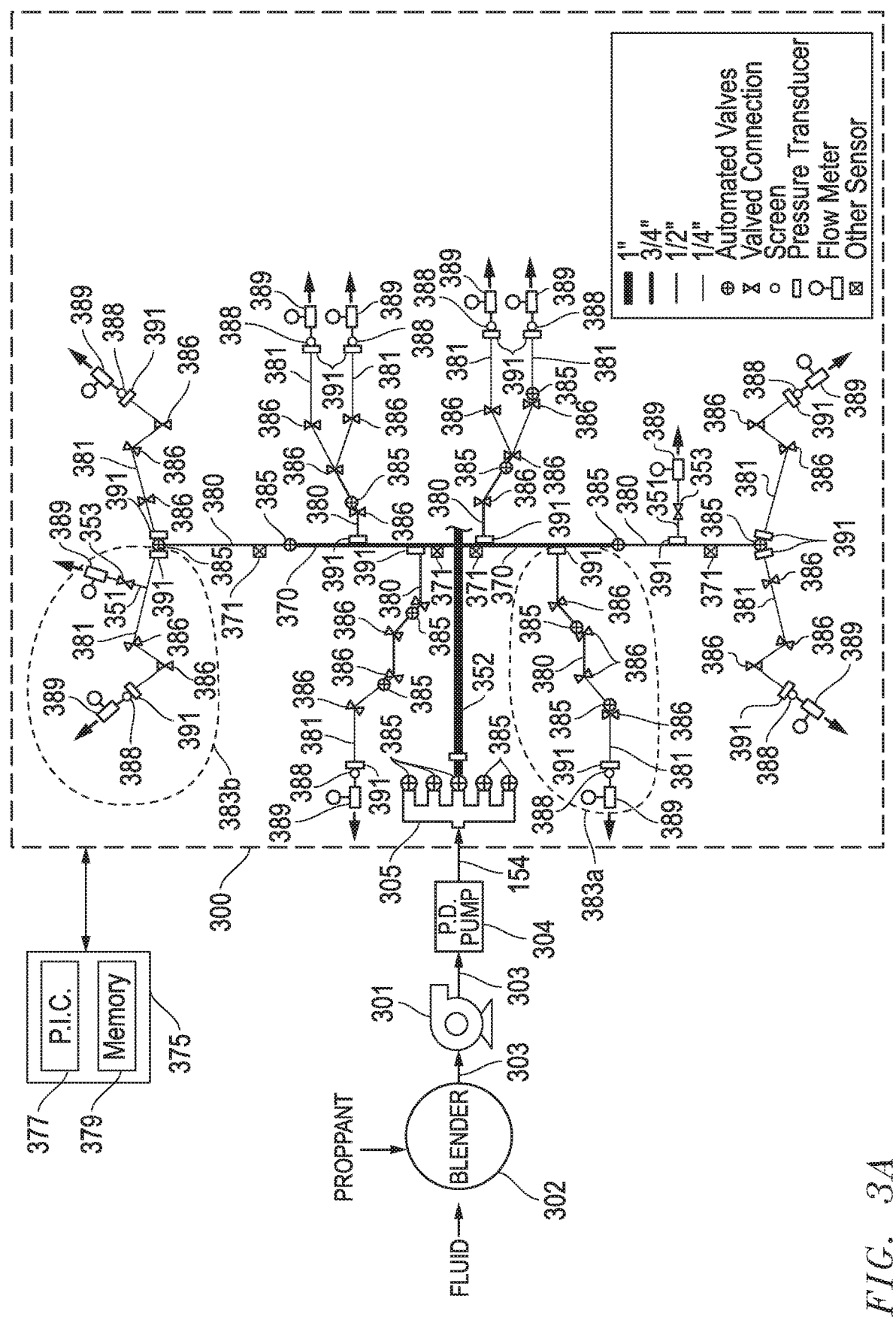
FIG. 3A illustrates a flow diagram of a test system network coupled to receive proppant-laden fluid according to one exemplary embodiment of the disclosed methods and systems.
Figure 4:
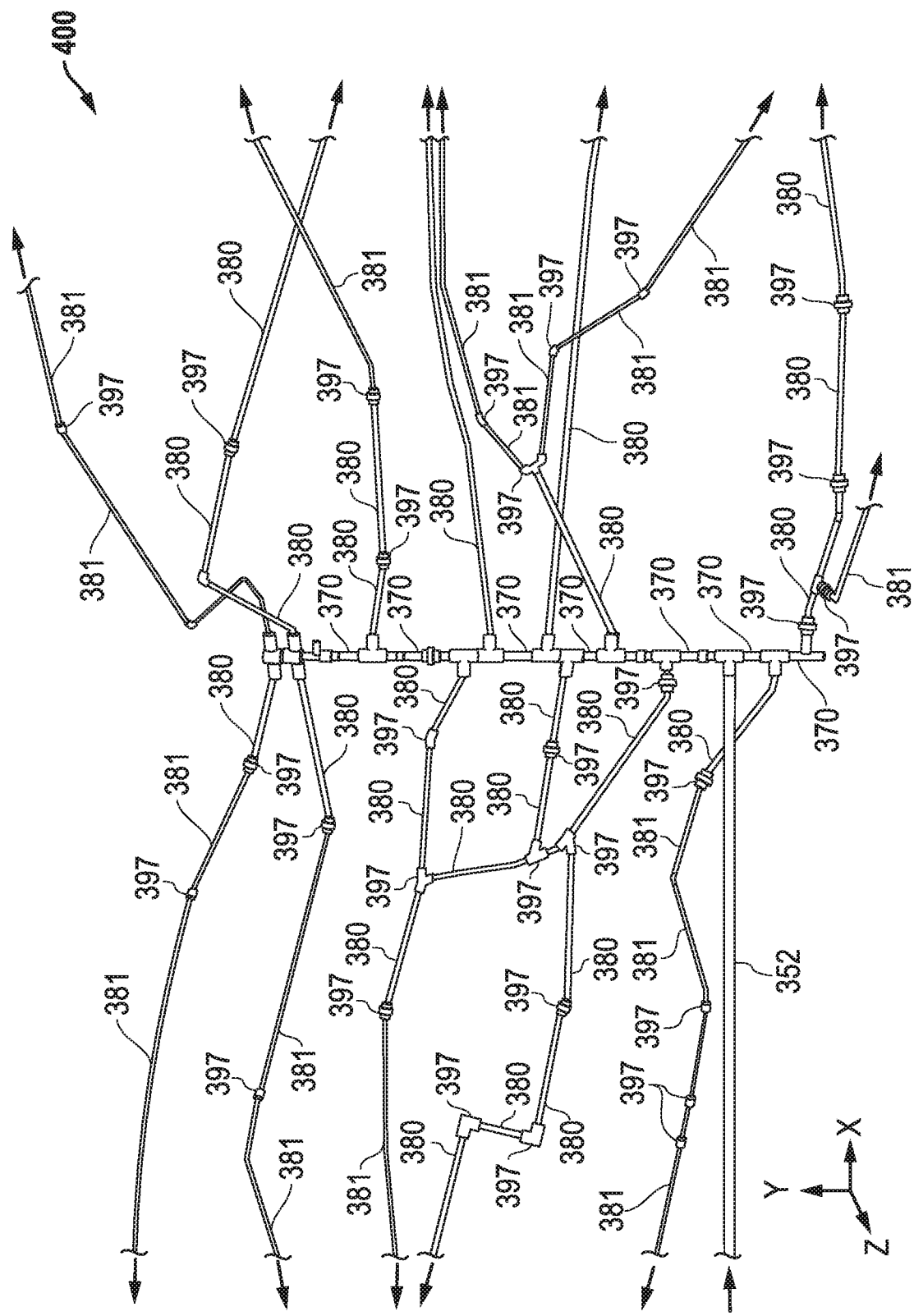
FIG. 4 illustrates a perspective view of a test system network according to one exemplary embodiment of the disclosed methods and systems.

FIG. 3A illustrates a flow diagram of a test system network 300 coupled to receive fluid (e.g., proppant-laden fluid) according to one exemplary embodiment of the disclosed systems and methods. It will be understood that the various conductor segments of FIG. 3A may be oriented in two-dimensions relative to each other (e.g., such as illustrated in FIG. 2, or in three-dimensions relative to each other as illustrated in FIGS. 1 and 4). Although described with regard to a particular combination of conductor segment types and test system network geometries, it will be understood that one or more of the particular features or components of test system network 300 may be utilized with other test system network geometries and/or other types and sizes of conductor segments. As shown in FIG. 3A, proppant (e.g., frac sand, sintered bauxite, ceramic proppant, resin coated proppant, etc.) may in one embodiment be blended with a transport fluid in blender 302 before introduction to input conductor segment 352 of test system network 300 via pumps 301 and 304 and manifold 305. In such an embodiment, a transport fluid may include any liquid (e.g., water-based, oil-based, etc.) and/or gaseous fluid (e.g., carbon dioxide, nitrogen, etc.) that is suitable for blending with proppant to form a proppant slurry 303 to transport the proppant into the conductor segments of test system network 300.

Examples of suitable transport fluids include, but are not limited to, slickwater fluid, linear gel fluid, crosslinked fluid, gelled oil fluid, gas-energized liquid, gas, etc. Examples of gelling agents that may be employed in a selected amount to form a gelled transport fluid as desired include, but are not limited to, natural polymers such as guar and guar derivatives such as caroboxymethyl-hydroxypropyl-guar, hydroxypropyl guar, carboxymethyl guar; hydroxyethyl cellulose and carboxymethyl hydroxyethyl cellulose; as well as synthetic polymers such as acylamido-methyl-propane sulfonate (AMPS), polyacrylic acid, polyacrylamide; and viscoelastic surfactants. Crosslinkers that may be optionally added to a transport fluid to form a crosslinked transport fluid include, but are not limited to, borate, metal chelates of Zr and Ti, etc. A gelled transport fluid may also include an optional breaker, such as enzymes, acids, oxidizers, etc. Other additives that may be present in a transport fluid include, but are not limited to, fluid loss additives (e.g., such as diesel, etc.). It will be understood that it is also possible that proppant-free fluids (e.g., such as the above-described fluids suitable for transport fluids) may also be introduced to test system network 300 and evaluated in a manner similar as described herein for proppant-laden test fracture fluids, with the exception of the absence of proppant particle analyses.

In one embodiment, any combination of fluid and proppant may be employed to create a proppant slurry 303 (e.g., liquid-based slurry, gas-based slurry, gas-energized liquid-based slurry, etc.) that is suitable for fracturing an actual underground formation such as formation 100 of FIG. 1. In this regard, ratio of fluid to proppant may be controlled by metering proppant into blender 302 during test pumping to achieve desired proppant loading in slurry 303. In this regard, it is possible to test proppant transport by pumping a proppant slurry 303 as a proppant-laden test fracture fluid 154 having a single proppant loading into test system network 300, or by pumping a proppant slurry 303 as a proppant-laden test fracture fluid 154 having a varying proppant loading (e.g., by pumping a proppant-laden test fracture fluid 154 into system 300 in two or more different stages having different proppant loadings). Example proppant loadings range from about 0.5 lb./gallon to about 4.0 lb./gallon, although proppant loadings greater than 4.0 lb/gallon and less than 0.5 lb./gallon are also possible. In one embodiment, proppant mesh sizes be may be any mesh size or range of mesh sizes that is suitable for fracturing an actual underground formation such as formation 100 of FIG. 1. Example proppant mesh sizes include, but are not limited to, 16/30, 20/40, 30/50, 40/70, and 100 mesh although larger and smaller proppant sizes are also possible.

Still referring to FIG. 3A, fluid may be provided to blender 302 from charge pump/s and/or holding tanks, and proppant may be provided to a hopper of blender 302 using a pneumatic conveyor and pneumatic transfer line. However, any other suitable combination of fluid-handling and solid-handling components may be alternatively employed to form slurry 303. In one embodiment, pump 301 may be a centrifugal pump and pump 304 may be a positive displacement pump (e.g., such as duplex, triplex, quadraplex pump, etc.) that is suitable for providing sufficient pressure to pump the proppant-laden fluid slurry 303 as a proppant-laden test fracture fluid 154 through the various conductor segments of test system network 300. During introduction of proppant-laden test fracture fluid 154 into test system network 300, proppant may be transported and deposited within one or more of primary conductor segments 370, secondary conductor segments 380 and/or tertiary conductor segments 381 such that only fluid (with no proppant) exits network 300 outward through optional screens 388 and optional flow meters 389 provided at or near terminal ends of tertiary conductor segments 381 of each separate output arm of test system network 300 as shown, it being understood that in another embodiment one or more terminal ends of tertiary conductor segments 381 may be open instead. Pressure required to pump the proppant-laden test fracture fluid may be controlled, e.g., by a combination of flow rate into a particular geometry of network 300 and back pressure maintained by screens and/or valve settings within and/or at the outlets of the network 300. Flow meters 389 may be of any suitable flow meter type for measuring fluid flow at a selected location of a conductor segment including, for example, Coriolis flow meters such as a Micro Motion model number 1700R12ABAEZZZ flow meter available from Emerson Electric Co. of St. Louis, Mo., although other types of flow meters may be employed.

In the embodiment of FIG. 3A, pressure transducers 391 are shown placed at fluid entrance points to each output "arm section" of one or more conductor segments extending sideways from vertical primary conductor segments 370 and vertical secondary conductor segments 381. Pressure transducers 391 may be any suitable type of pressure transducer suitable for measuring pressure at a selected location of a conductor segment including, for example, an Econoline Pressure Transducer Item No. 0.104.00503.020401 available from Keller America of Newport News, Va. Such a configuration allows the amount of pressure required to introduce a test fluid (e.g., containing proppant) into a given arm of test system network 300 to be measured at the same time the given flow rate through the given arm is determined in this case by the flow meter 389 at or near the terminal end/s of the same given output arm section of test system network 300.

For purposes of illustration, two of the multiple output arm sections of test system 300 are encircled and denoted 383a and 383b in FIG. 3A, it being understood that an arm section (e.g., output arm section) may be defined to include different combinations of conductor segments and in other areas of test system 300 (e.g., such as may be selected for analysis as described below). In one embodiment, pressure drop ($\Delta P$) between two spaced points within a given output arm section 383 may be measured while test fluid is simultaneously pumped through the arm section, e.g., to determine when proppant has entered and/or been deposited within the arm section 383, and when the entire arm section 383 has been filled with proppant. For example, while test fluid is being pumped through network of test system 300, the test fluid pressure at a first and upstream point (e.g., the entrance or inlet) of a given arm section 383 may be measured with a first pressure transducer 391 while pressure at a second and downstream point (e.g., at an exit or outlet) of the same given arm section 383 is simultaneously measured with a second pressure transducer 391. Flow rate of the test fluid through the given arm section 383 may be measured (e.g., using a flow meter 389 at the outlet/s of the arm section 383 and/or positioned at any other suitable point/s within arm section 383 such as at any leak off openings 351) simultaneously with measurement of pressure drop across at least a portion of the given arm section 383.

In one embodiment, simultaneously monitoring test fluid flow rate and $\Delta P$ across a given arm section 383 (or portion thereof) allows a determination to be made as to whether proppant is being introduced into the given arm section 383 during test fluid pumping and, if not, then why (e.g., due to little or no test fluid flow rate through the arm section 383, due to high pressure turning the corner at the entrance to the arm section 383, or both). In one embodiment, rate of proppant deposition within the given arm section 383 may also be estimated from the monitored arm section flow rate and $\Delta P$. In another embodiment, measured arm section $\Delta P$ and/or measured pressure at an upstream point (e.g., such as inlet) of a given arm section 383 may be monitored to determine what value or magnitude of $\Delta P$ or pressure is required to fill a given arm section 383 with deposited proppant before proppant flow is diverted to fill another given arm section/s 383 of test system 300. For example, during a given test fluid pumping procedure, different individual arm sections 383 of the same test system 300 may require a different magnitude of $\Delta P$ and/or upstream point pressure be achieved before accepting proppant-laden test fluid, and thus different individual arm sections 383 may begin accepting proppant-laden fluid and/or become filled with proppant at different times than other individual arm sections 383 (e.g., sequentially). Thus, in one embodiment the pressure ($\Delta P$ and/or upstream point pressure) at which each different arm section begins accepting proppant-laden test fluid and then becomes filled with proppant may be determined. And in another embodiment, the sequence with which multiple different arm sections of a given test system 300 begin accepting proppant-laden test fluid and then become filled with proppant relative to each other may be determined from the pressure and/or flow rate measurements.

It will be understood that FIG. 3A is exemplary only, and that an output arm section 383 may be defined to have any orientation, position and or length relative to an input conductor segment 352 and/or to any intervening conductor segments as desired or needed to fit a given test system application. Moreover, it is also possible in other embodiments to only measure the pressure required to introduce a test fluid (e.g., containing proppant) into a given arm section 383 of test system network 300 (i.e., without measuring flow rate through the given arm section of the test system network), or alternatively to only measure flow rate through the given arm section 383 (i.e., without measuring pressure required to introduce a test fluid into the given arm section 383).

In one embodiment, terminal ends of conductor segments 381 may be coupled to a spent-fluid collection network for disposal or for recycling of the fluid exiting at the various outlets of the test system network 300. Optional screens 388 may be present for purposes of capturing (or retaining) different size proppant particles and may be selected to allow for varying flow rates of proppant-laden test fracture fluid 154 while accommodating (not exceeding) the maximum pressure rating of the test system network 300. Thus, in one embodiment a screen 388 may have a mesh size selected to prevent larger proppant sizes present in the test fluid 154 from passing through the screen and outside the network 300, while at the same time allowing other smaller size proppants present in the test fluid 154 to pass through the screen to exit the network 300. In other embodiments, a screen 388 may be selected to prevent all proppant sizes present in the test fluid 154 from passing through the screen.

In other embodiments, it is possible to include controllable (or alternatively non-controllable) "leak off" ports (e.g., openings) at one or more selected locations within the body of the conductor segments of test system network 300 for purposes of simulating fluid leak off into the formation during a fracture treatment. This may be accomplished, for example, by providing relatively small fluid exit openings 351 (e.g., without screens) through the wall of one or more conductor segments of test system network 300. Such openings 351 may be of a size (e.g., diameter) that is selected according to the characteristics (e.g., natural permeability) of the particular formation 100 that is being simulated, and in one exemplary embodiment may be sized relatively small to the size of at least a portion (or alternatively all) of the proppant particles being tested so that fluid but not relatively larger proppant particles may pass out of the conductor segment through the leak-off port during testing. Such exit openings 351 may be dimensioned to function as leak off ports by providing a fluid transport path to allow fracture fluid to exit the network 300 (without proppant) in order to test the ability of diverting agents (e.g., such as benzoic acid flakes, rock salt, Halliburton BioVert®, etc.) that may be present in the proppant-laden test fracture fluid 154 to obstruct fluid flow through these leak off ports so as to divert or contain the fluid flow within the conductor segments (e.g., 370, 380 and 381).

In one exemplar embodiment, size of fluid exit openings 351 may be selected to be smaller than the external dimensions of the smallest proppant particles present in a proppant-laden test fracture fluid 154 such that these particles cannot pass through the provided fluid exit openings 351. Number and density of fluid exit openings 351 provided in the side wall of a given conductor segment may vary based on the characteristics of a formation 100 being simulated. As further shown in FIG. 3, optional controllable valves 353 may be coupled to regulate fluid flow though fluid exit openings 351 so that fluid leak off may be selectably simulated when desired.

Besides optional flowmeter 389, other types of sensors may be optionally present to monitor or otherwise sense characteristics of fluid and/or proppant at one or more locations within test system network 300. Examples of such sensors include, but are not limited to, pressure sensors 391, and other sensors 371 such as density sensors, photoelectric sensors, temperature sensors, spectral sensors or spectrometers, radiation detectors, fluid and/or proppant velocity sensors, viscosity sensors, video cameras, electrical resistivity sensors, etc. Signals and/or data from these sensors may be transmitted wirelessly or by hardwire (e.g., by individual wire conductors from each sensor that are not shown) to data collection/data acquisition equipment which may include, for example, an optional computer system 375 having optional analog to digital converters (ADCs) and/or signal conditioning circuitry, one or more programmable integrated circuits 377 (e.g., CPU, controller, microcontroller, microprocessor, ASIC, etc. or executed on a programmable logic device "PLD" such as FPGA, complex programmable logic device "CPLD", etc.) Examples of such a computer system include, but are not limited to, a computer workstation or computer server, portable computer system such as a tablet computer, a notebook computer, etc. Such data may be stored in memory 379 (e.g., non-volatile memory or non-volatile storage drive) for future analysis and/or may be monitored in real time, e.g., so as to allow a fluid and/or proppant transport test procedure to be modified while the test is underway based on the data collected in real time. Computer system 375 may also be configured to provide wired and/or wireless control signals for controlling operation of automated valves 385.

In one embodiment, pumping pressure for proppant-laden test fracture fluid 154 may be set to be about 150 psig, although greater or lesser pumping pressures are possible, e.g., depending on the maximum pressure rating of components of a given test system network 300, the type of fracture treatment being simulated, etc. Moreover, pumping pressure may vary during a given test procedure, e.g., with different stages of a proppant-laden test fracture fluid 154 that include different proppant concentrations and/or sizes, different base fluid composition, etc. It will be understood that pumping pressure may be limited to below the lowest pressure rating of the various interconnected conductor segments of test system network 300, and that pumping pressure may controlled by varying the pump rate and/or by back pressure applied to fluid exiting from the various conductor segments of test system network 300.

As shown in FIG. 3A, optional manifold 305 may be present between pump 304 and input conductor segment 352. Manifold 305 may be optionally present, for example, to provide additional connection points for connection to separate input conductor segments. Such additional input conductor segments may each in turn be connected to provide slurry to other subsidiary conductor segments to hat are separate and isolated from the interconnected conductor segments of network 300, or other subsidiary conductor segments that are interconnected with one or more conductor segments of network 300. In one embodiment, conductor segments of test system network 300 may be cylindrical tubing of different sizes as further described below and indicated in the legend of FIG. 3A. In this regard, exemplary lengths and outside diameters of conductor segments are described and illustrated in relation to FIG. 3A for example only, it being understood that conductor segments of greater or lesser lengths and/or of larger or smaller diameters may alternatively be employed. Although not required, use of clear tubing allows visual observation and tracking of fluid and/or proppant flow during a test procedure, as well as the deposited proppant distribution after completion of such a test procedure It will also be understood that any other type and/or shape of conductor segments may be employed for a test system network that is suitable for simulating flow of a proppant-laden fracture fluid through a fracture network, e.g., including non-cylindrical conductors (such as conductors having cross-sectional areas perpendicular to direction of flow that are oval shaped, square shaped, rectangular shaped, etc.), conductors having roughened internal diameter surface, etc.

One exemplary embodiment of the configuration of FIG. 3A is explained below using the following example conductor segment dimensions (e.g., diameters and lengths), it being understood that these conductor segment dimensions are exemplary only and that any other suitable greater or lesser diameter and/or length of conductor segments (and/or combinations thereof) may be employed as desired or needed to meet the characteristics of a given test system application. For purposes of illustration, the example conductor segment dimensions may include a 1-inch inside diameter (I.D.) horizontal or substantially horizontal input conductor segment 352 that may be provided to simulate a horizontal wellbore that penetrates an underground formation in the manner of horizontal wellbore 107 of FIG. 1, although an input conductor segment may alternatively be configured with an I.D. that is greater than 1-inch, or that is less than 1-inch. Length of input conductor segment 352 may be about two feet in one embodiment, although greater or lesser lengths are also possible. As shown, input conductor segment 352 may be coupled between manifold 305 and a tee connection (e.g., integral or separate connector) that is oriented to provide an upward-extending ¾-inch I.D. primary conductor segment 370 of an upper section or network branch of the test system network 300 and an opposing downward-extending ¾-inch I.D. primary conductor segment 370 of a lower section or branch of test system network 300. Upward and downward-extending primary conductor segments 370 may be so configured to simulate primary fracture segments 120 that extend upward and downward at 90 degrees orientation from horizontal wellbore 107 of FIG. 1, it being understood that one or more primary conductor segments may be coupled to extend at angles other than 90 degrees (and/or directions other than upwards and downwards) from an input conductor segment, and that multiple primary conductor segments may be coupled to an input conductor segment in staggered or non-opposing relationship to each other. In this exemplary embodiment, length of each of ¾-inch I.D. primary conductor segments 370 may be about four feet as shown, although greater and lesser lengths of conductor segments 370 are possible and conductor segments 370 do not have to be the same length.

The example conductor segment dimensions of FIG. 3A include ½-inch I.D. secondary conductor segments 380 as they may be coupled to ¾-inch I.D. primary conductor segments 370, and ¼-inch I.D. tertiary conductor segments 381 as they may be coupled to ½-inch I.D. secondary conductor segments 380 to simulate various subsidiary facture segments 123 of FIG. 1. In one embodiment each of secondary conductor segments 380 include a secondary conductor segment 380 of about six feet in length that is coupled to the end of each of primary conductor segments 370 as shown, although greater and lesser lengths of conductor segments 380 are possible and conductor segments 380 do not have to be the same length as each other. Other secondary conductor segments 380 are coupled to extend sideways at 90 degrees from opposing sides of primary conductor segments 370 as shown. Secondary and tertiary conductor segments 380 and 381 may be so configured to simulate subsidiary fracture segments 123 of FIG. 1, it being understood that additional conductor segments of smaller diameter (e.g., less than ¼-inch I.D.) may be coupled to extend from tertiary conductor segments 381 in telescoping or tapered fashion.

Figure 3B:
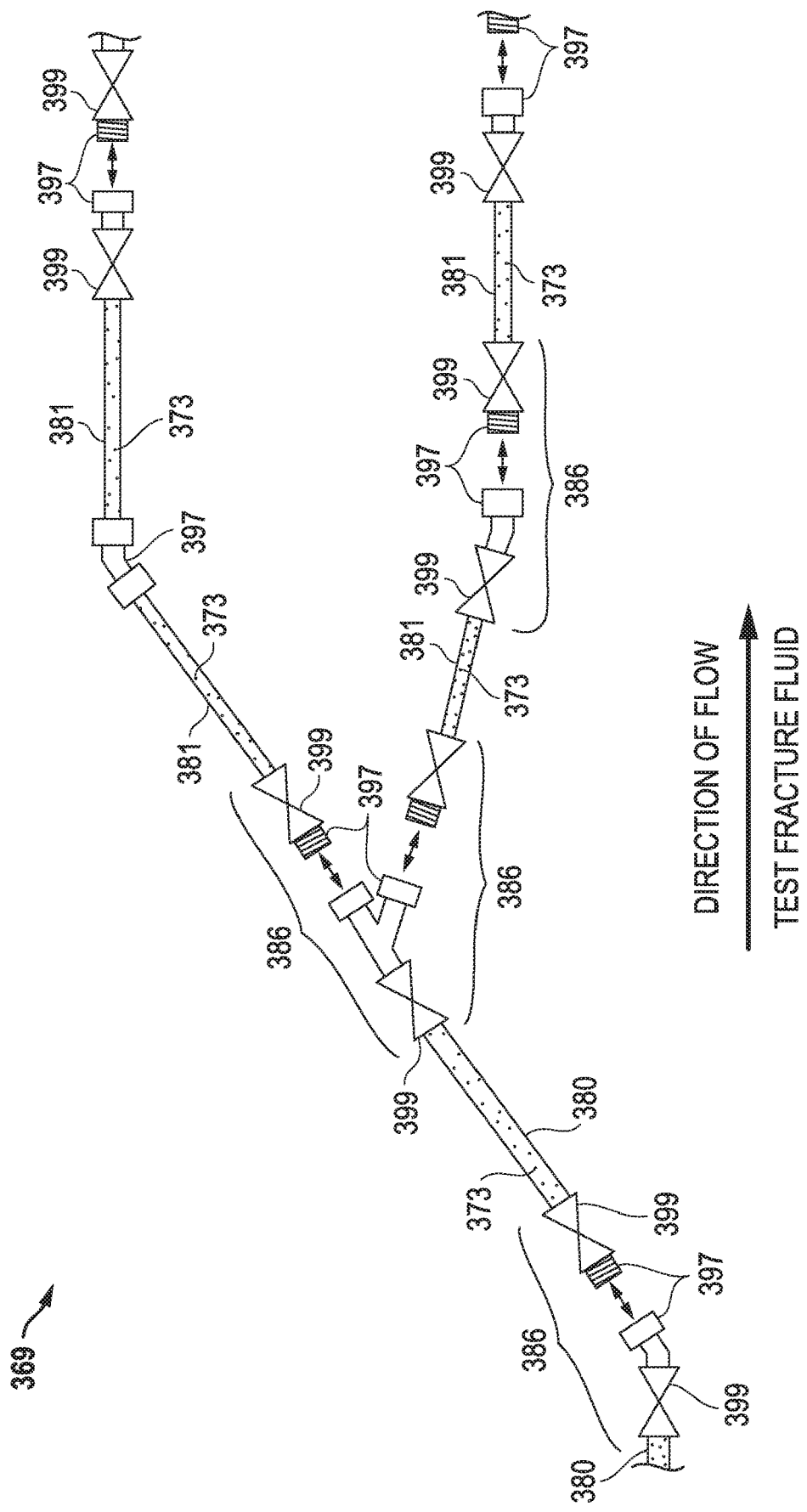
FIG. 3B illustrates conductor segments of a part of a test system network disassembled according to one exemplary embodiment of the disclosed methods and systems.

In the embodiment of FIG. 3A, automated or controllable (e.g., pneumatically or electrically actuated) valves 385 (e.g., ball or gate valves) are optionally coupled between conductor segments at selected locations for purposes of controlling (e.g., allowing, restricting or disallowing) fluid flow through a given conductor segment/s, e.g., in real time during flow of proppant-laden slurry through test system network 300. Also illustrated are tubing junctions in the form of valved connections 386 that are provided to couple together different conductor segments and/or to allow conductor segments to be added or removed to create different fracture network geometries. In one exemplary embodiment, each of valved connections 386 may optionally include a detachable connection 397 (e.g., threaded union, compression fitting, etc.) coupled between inline isolation valves 399 (e.g., manual or servo-actuated ball or gate valves, etc.) that are coupled at or near the end of each conductor segment as shown in FIG. 3B which illustrates a portion 369 of a test system network 300. As shown in FIG. 3B, angled connections 397 may be provided in one embodiment to couple two conductor segments together at any desired angle between greater than 0 degrees to less than 180 degrees.

As further shown in FIG. 3B, provision of valved connections 386 may be used in one embodiment to allow individual conductor segments (e.g., of test system network 300) to be detached from the other conductor segments with their respective isolation valves 399 closed for further analysis of their contents 373 (e.g., including deposited constituents of a test fluid such as proppant and accompanying fluid) that is left within an isolated space (or sample chamber) of each conductor segment between the closed valves 399 of the conductor segment following flow of a proppant-laden test fracture fluid 154 during a proppant test procedure. In this way, a single conductor segment or multiple segments isolated between valved connections 386 (or other suitable types of tubing junctions) may be removed and analyzed after flowing a test proppant slurry 303 through test system network 300. In one embodiment, proppant may be deposited within a given conductor segment during flow of the proppant slurry 303 through test system network 300. Afterwards, the disassembled conductor segment may be removed to allow sieve analysis of the contents to determine particle size distribution within the disassembled segment, viscosity of fluid (e.g., liquid) left within the disassembled segment, conductivity testing of the particular particle distribution deposited in each section, etc. It will be understood that similar analyses of the content of multiple conductor segments may be performed where multiple conductor segments are grouped together between valved connections 386 as shown in the upper right of FIG. 3B which represents a portion of a test system network 300 that has been disassembled as further described herein.

It will be understood that any suitable type of analysis may be performed on the contents 373 (e.g., deposited proppants and/or fluids) that remain in each isolated conductor segment or isolated group of conductor segments such as illustrated in FIG. 3B. Examples of such analyses include, but are not limited to, particle size and particle distribution testing, conductivity testing of deposited proppant and/or viscosity testing of remaining fluids (e.g., liquids) such as outlined in full evaluation per API RP 19C ("Recommended Practice for Measurement of Proppants Used in Hydraulic Fracturing and Gravel-packing Operations") and/or API RP 19D ("Recommended Practice for Measuring the Long-term Conductivity of Proppants"). Analyses may be so performed after pumping a full simulated fracture treatment through a test system network 300, or after pumping any fractional part of a full simulated fracture treatment that is stopped before the full treatment is pumped.

Figure 3C:
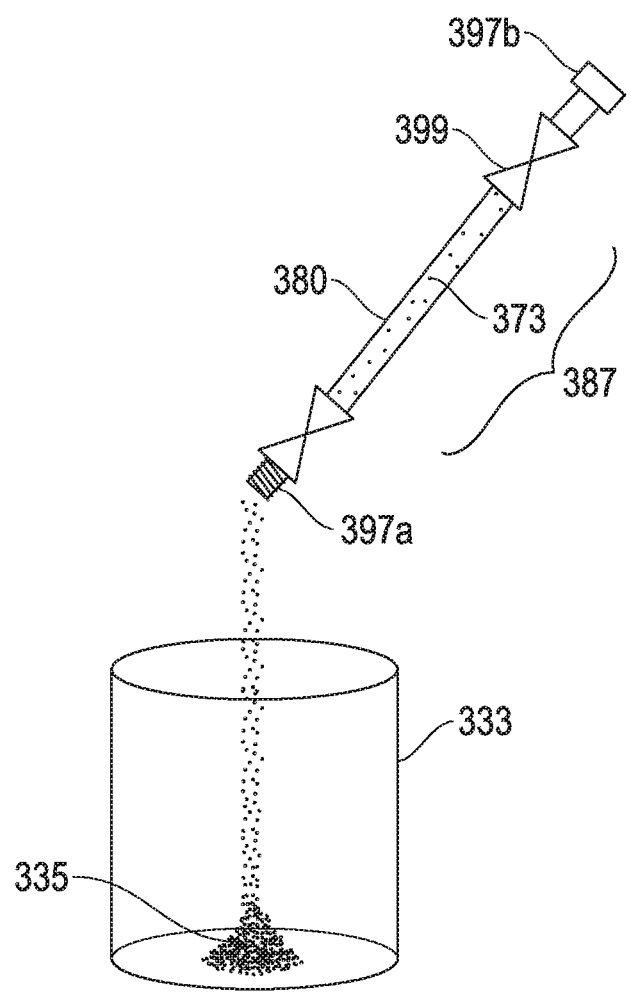
FIG. 3C illustrates removal of contents from inside a dissembled conductor segment according to one exemplary embodiment of the disclosed systems and methods.

In one exemplary embodiment, once pumping has stopped, suspended proppant may settle in each conductor segment or group of conductor segments. Isolation valves 399 may then be closed at each end of a conductor segment or group of interconnected conductor segments to isolate the contents 373 remaining within a sample chamber 387 defined in the space between two isolation valves 399. Detachable connections 397 on each side of each isolated conductor segment or isolated group of conductor segments may then be separated (e.g., unscrewed) to allow removal of the conductor segment/s together with the contents 373 isolated inside. At least one of the isolation valves 399 of each isolated conductor segment/s may then be opened to allow removal of contents 373 (e.g., isolated fluid and/or proppant particles) from the sample chamber 387 defined inside the conductor segment/s into a collection container 333 as illustrated in FIG. 3C. Analysis may then be performed on a weighed proppant sample 335 and/or fluid (e.g., liquid) of the removed contents 373 as described elsewhere herein. In this way, proppant pack characteristics (e.g., permeability, conductivity, particle distribution, etc.) as well fluid (e.g., liquid) viscosity and other fluid properties may be measured in different portions of a simulated proppant pack.

For example, four-stack long term conductivity and retained conductivity testing may be performed on a proppant sample 335 using an International Organization for Standardization (ISO) conductivity cell and ISO procedures 13503-5:2006E entitled "Procedures for Measuring the Long Term Conductivity of Proppants" which is incorporated herein by reference. One example of such a conductivity cell is described in U.S. Pat. No. 8,286,514, which is incorporated herein by reference in its entirety. In one embodiment, conductivity and permeability values may be determined according to the following relationships (it being understood that any other suitable methodology and/or relationships for determining conductivity and/or permeability may be alternatively employed in the practice of the disclosed methods and systems):

$$\text{Conductivity: } kWf = 26.78(\mu Q/\Delta P)$$

$$\text{Permeability: } k = 321.4 \ \mu Q/[(\Delta P)Wf]$$

where:
k is the tested formation sample pack permeability, expressed in Darcy's;
kWf is the tested formation sample pack conductivity, expressed in millidarcy-feet;
$\mu$ is the viscosity of the test liquid at test temperature, expressed in centipoises;
Q is the flowrate, expressed in cubic centimeters per minute;
$\Delta P$ is the differential pressure, expressed in psi; and
Wf is tested formation sample pack width, expressed in inches.

In another example, particles of a proppant sample 335 may be analyzed by passing particles of the proppant sample 335 through a stack of multiple screens or sieves (ordered from largest mesh size screen at the top to smallest mesh size screen at the bottom) to characterize the particles of the sample. Using this technique, properties such as particle size distribution, mean particle diameter, median particle diameter, etc. may be determined for a given proppant sample 335, for example, such as in a manner described in Chapter 26, pages 803-817, McCabe and Smith, Unit Operations of Chemical Engineering, Third Edition, 1976, which is incorporated herein by reference.

To illustrate, before pumping, a given proppant having a particular initial mean particle size distribution may yield an initial permeability at fracture base of 1000 millidarcies as measured at 1000 psi (or for example conductivity of 2 lb./ft$^2$) with a sieve analysis showing a particular initial distribution of different particle sizes. However, after pumping this proppant as part of a proppant-laden test fracture fluid 154 through a test system network 300, different mean particle distributions of the proppant may be deposited as a proppant pack at different points within different isolated conductor segments within the fracture network 300 (e.g., a given mean particle distribution of "x" may be deposited at the input of a primary conductor segment 370 while a mean particle distribution of 0.7x may be deposited at a secondary conductor segment 380 of the same fracture network 300, etc.). In this regard, the deposited proppant pack mean particle distribution within a given isolated conductor segment/s may vary as a function of its distance from input conductor segment 352, its orientation (e.g., angle from the horizontal), its internal size (e.g., diameter) and/or position relative to other conductor segments (e.g., primary, secondary, tertiary, etc.) within network 300, its proximity relative to any optional exit openings 351 or terminal screens 388, etc.

Thus, for example, the proppant pack deposited from the same proppant in an isolated conductor segment located at the simulated fracture tip (e.g., at the terminal end of an isolated tertiary conductor segment 381) may be found to have a different particle distribution and permeability (e.g., reduced to only 200 millidarcies as measured at 1000 psi, or for example conductivity of 0.2 lb./ft$^2$) than the initial measured fracture base particle distribution and 1000 millidarcies measured at 1000 psi (or conductivity of 2 lb./ft$^2$) described above. Deposited proppant pack properties and/or fluid (e.g., liquid) viscosity may be similarly tested in each of the isolated segments between the initial isolated conductor segment nearest to input conductor segment 352 and the isolated conductor segment/s furthest from input conductor segment 352, e.g., to arrive at a table of different permeabilities/conductivities, particle distributions and viscosities starting with that measured for the initial isolated conductor segment and measured for each isolated conductor segments between the initial conductor segment to the furthest from the input conductor segment 352. Results of such testing may be compared to predicted distribution, e.g. to allow non-API proppants to be tailor-designed for a given simulated subterranean formation. Further, proppant performance model simulations may be developed using the measured non-uniform nature of deposited proppant particle distribution, deposited proppant permeabilities/conductivities, fluid properties, etc. determined throughout the network 300, versus conventional models that assume non-varying homogenous proppant and fluid properties throughout the proppant pack from input to fracture tip of a fracture network.

Consequently, in one exemplary embodiment various proppants having different particle size distributions may be individually tested (e.g., with different base fluids) to determine which proppant and/or base fluid combination yields an optimum or otherwise desired permeability in a given configuration of test system network 300. Alternatively, a proppant-laden test fracture fluid 154 may be formulated from a given proppant and base fluid to simulate an actual fracture treatment that has already been performed on an actual underground or subterranean formation, e.g., for purposes of performance matching or evaluation of fracture treatment execution.

Figure 3D:
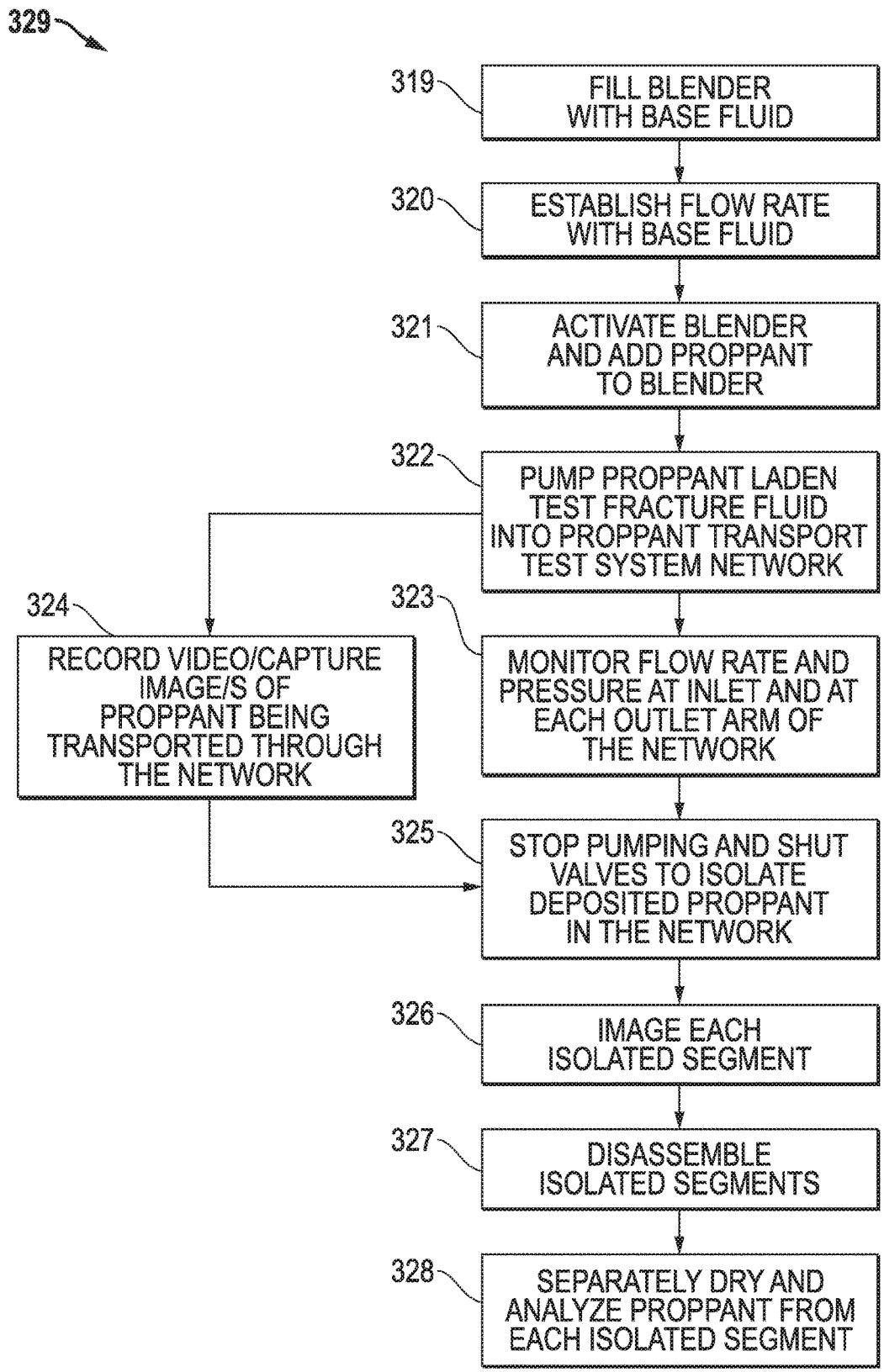
FIG. 3D illustrates methodology according to one exemplary embodiment of the disclosed systems and methods.

FIG. 3D illustrates one exemplary embodiment of test methodology 329 that may be performed to use a test system network 300 to simulate and analyze fluid and/or proppant transport through different segments of a fracture network created in an underground formation during a hydraulic fracturing treatment. As shown, methodology 329 begins in step 319 where blender 302 is filled with a determined amount of water (or any other base fluid) as specified for a given test treatment. Next, in step 320 centrifugal pump/s 301 and positive displacement pump/s 304 (e.g., triplex pump) are turned on to introduce base fluid only (i.e., without proppant) through a fluid conductor into a flow loop that includes test system network 300 (e.g., at a specified predetermined flow rate) as a pad to establish a baseline flow rate without proppant through test system network 300. During step 320, it is verified that all conductor segments of the network 300 are open to flow, and that all sensor/transducers are operating properly. After successful completion of step 320, the blender 302 is then activated in step 321 by turning on its paddles prior to any proppant entering the blender 302, and then a specified concentration and type of proppant to be tested is added to blender 302. Next in step 322, centrifugal pump/s 301 and positive displacement pump/s 304 (e.g., triplex pump) are operated to move the proppant and fluid mixture slurry 303 from blender 302 to positive displacement pump 304, and then from positive displacement pump 304 as a proppant-laden test fracture fluid 154 through a fluid conductor into the flow loop that includes test system network 300, e.g., at a specified predetermined flow rate. It will be understood that the fluid volume, proppant type, proppant concentration, and flow rate of a given proppant-laden test fracture fluid 154 into test system network 300 may be selected based on a number of factors, such as volume, diameter and pressure rating of components of test system network 300, type of underground formation being simulated, type and volume of actual full-size fracture treatment being simulated, identity of a particular sensitivity test fracture treatment run (e.g., economic and/or conductivity) being performed as part of a multi-test fracture treatment run analysis, etc. It is also possible to employ multiple blenders 302 and to pump multiple different stages of proppant-laden test fracture fluid 154 that each have different proppant concentration, proppant type, proppant size, etc.

In step 323, flow rate and pressure of fluid may be monitored during the test treatment at the inlet of the test system network 300, and flow rate and pressure of fluid may be monitored at each arm of network 300 (e.g., at the output of each arm), e.g., so that fluid leak-off and/or pressure drop in each arm may be monitored during the test treatment. At the same time, video (and/or still) images capturing the transport of proppant throughout test system network 300 may be optionally recorded in step 324, e.g., where at least a portion of the conductor segments of the network 300 are transparent or translucent. After all proppant has been pumped from blender 300, the tail end of proppant-laden test fracture fluid 154 may be optionally over displaced into and through input conductor segment/s of network 300 with proppant-free fluid.

After the test treatment is completed, pumping is stopped in step 325, and isolation valves then closed to prevent the deposited proppant from moving and to isolate the deposited proppant within at least a portion of the conductor segments of the test system network 300. Then in step 326, one or more isolated proppant-containing segments may be optionally video imaged and/or still picture imaged (e.g., where segments are transparent or translucent), and each segment disassembled from the test system network 300 piece by piece in step 327, e.g., such as shown in FIG. 3B. Then, in step 328 the contents 373 (e.g., deposited proppant and/or fluid) may be removed from one or more of the isolated segments for analysis as shown in FIG. 3C. For example, isolated deposited proppant that is removed from each given segment may be dried, and a particle size distribution test individually performed on the proppant removed from each given segment. From the varying particle distributions, conductivity testing may also be performed to demonstrate how flow capacity is placed in the system.

It will be understood that the methodology of FIG. 3D is exemplary only, and that any other combination of additional, fewer, re-ordered, and/or alternative steps may be employed that is suitable for using a test system network to simulate and analyze fluid and/or proppant transport through different segments of a fracture network created in an underground formation during a hydraulic fracturing treatment.

FIG. 4 illustrates one exemplary embodiment of a three dimensional test system network 400 as it may be configured in a laboratory environment with interconnected conductor segments of varying size and lengths to represent a relatively complex fracture network. As previously described, individual conductor segments may be made of clear tubing to allow visual observation of fluid and proppant flow by laboratory personnel during and after a fluid and/or proppant transport testing procedure. In this way, effectiveness of fracture treatment fluids and proppants may be evaluated, including how different types of proppants (e.g., white frac sand, light weight ceramic proppant, intermediate strength ceramic proppant, resin coated proppants, etc.) flow through a fracture network; how effectively or successfully is proppant being transported throughout the entire fracture network; how the density of proppants effect the flow within the fracture network; whether or not special or hybrid proppant (e.g., such as naturally buoyant proppant particles) successfully travels throughout the fracture segments of the fracture network; whether or not proppants segregate in the fracture network; what is the conductivity at different intervals within the fracture network, etc.

Figure 5:
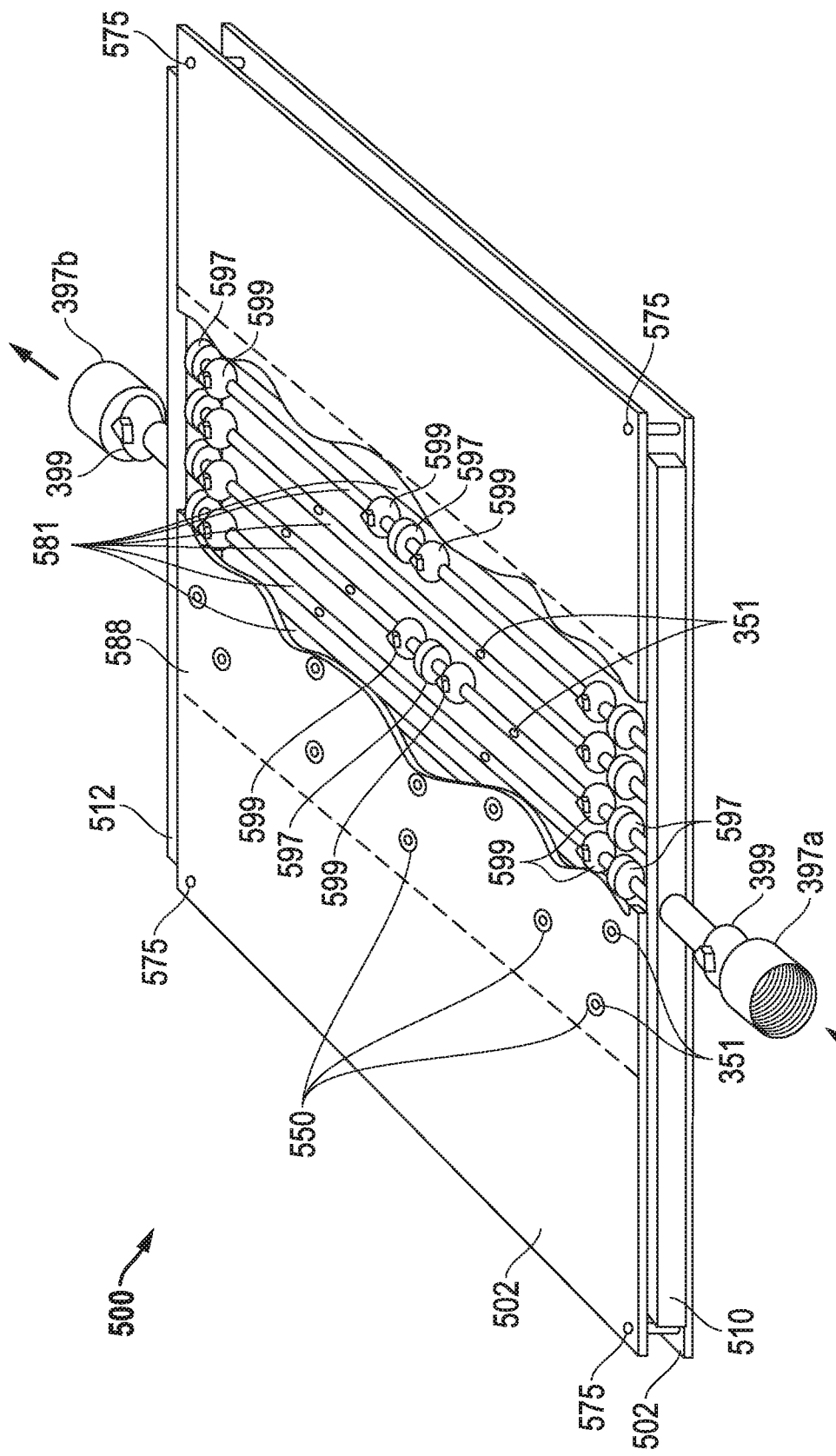
FIG. 5 is a cut-away perspective illustration of one exemplary embodiment of a segmented fracture test assembly according to one exemplary embodiment of the disclosed systems and methods.

FIG. 5 is a cut-away perspective illustration of one exemplary embodiment of a planar segmented fracture test assembly 500 that includes multiple side-by-side cylindrical conductor segments 581 that may be oriented parallel to each other and/or that may be of the same or different internal diameters as desired, and that are contained (e.g., sandwiched) between two opposing planar plates 502 (e.g., plastic or metal plates) that simulate a formation rock. Thus, in one embodiment all of the cylindrical conductor segments 581 may have the same internal diameter, while in another embodiment one or more of the cylindrical conductor segments 581 may have an internal diameter this is different from at least one (and in one embodiment all) of the other cylindrical conductor segments 581. In the illustrated embodiment, the multiple side-by-side conductor segments of assembly 500 are shown spaced apart for ease of illustration, it being understood that multiple side-by-side conductor segments of assembly 500 may be alternatively may be positioned to touch or contact each other, or alternatively may be closely spaced in adjacent relationship (e.g., spaced apart from each other at a distance less than the internal radius of each of the multiple cylindrical conductor elements of the test sub-assembly 500). As shown, the multiple conductor segments of assembly 500 are in this embodiment oriented and contained together within a common plane. Such an embodiment may be employed, for example, to model or simulate slot flow of fracture fluid and proppant in different sub-segments (e.g., linear slices or small cores) of a larger fracture conduit that may be created or otherwise exist (e.g., as a natural fracture) in a subterranean formation during a hydraulic fracture treatment. It will also be understood that non-cylindrical conductor segments may alternatively employed in place of cylindrical conductor segments 581, e.g., such as conductor segments having cross-sectional areas perpendicular to direction of flow that are oval-shaped, square-shaped, rectangular-shaped, etc.

Figure 7:
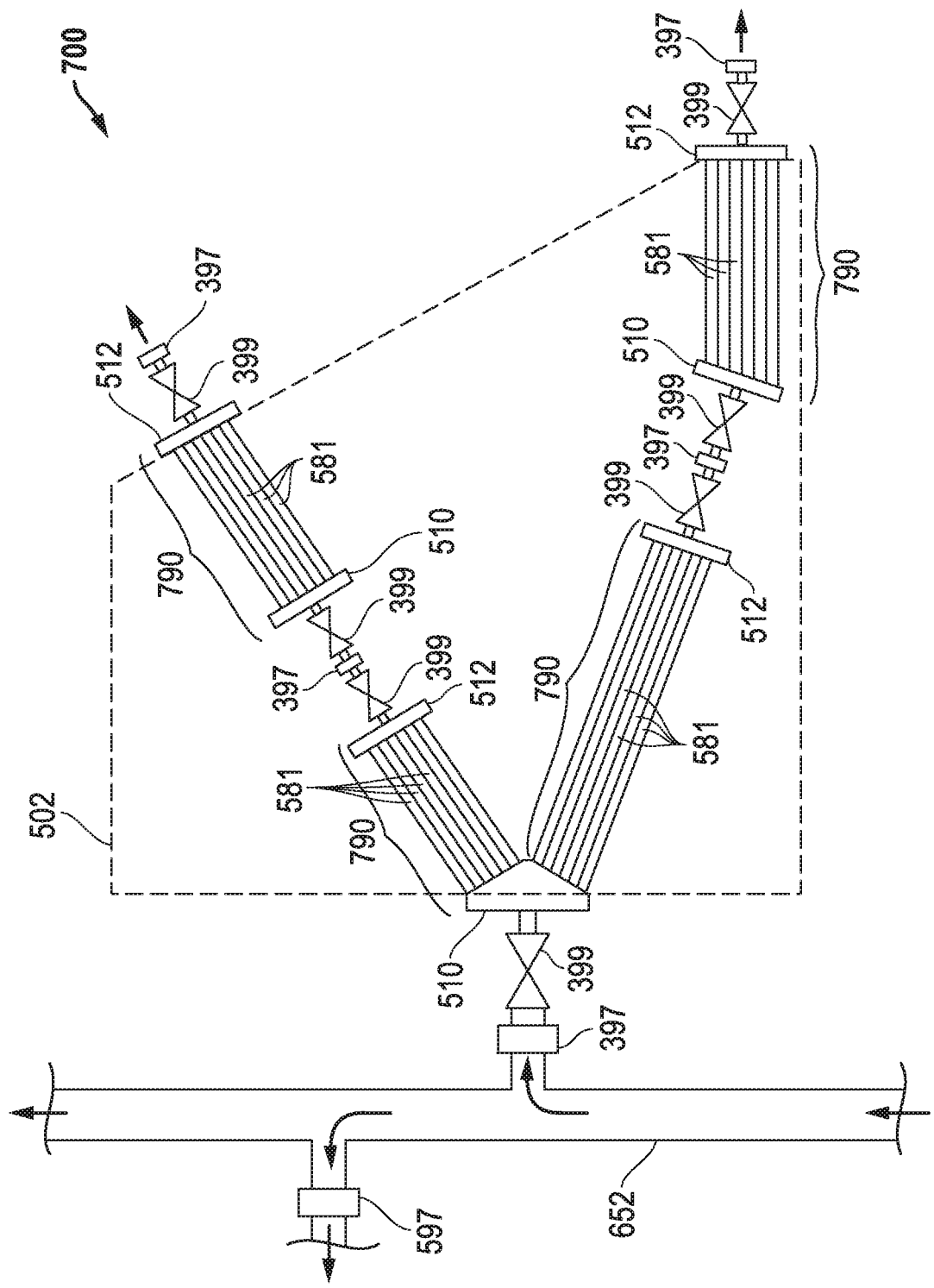
FIG. 7 illustrates conductor segments of a part of a test system network according to one exemplary embodiment of the disclosed methods and systems.

In one embodiment, one or more such fracture test assemblies 500 may be coupled as sub-assemblies within a test system network 300 in a variety of ways, e.g., such as coupled into network 300 as sub-assemblies in the place of individual (stand-alone) conductor segments (e.g., such as segments 370, 380, 381) so as to better evaluate fluid and proppant flow within particular parts of a network 300. Alternatively, an entire network may be constructed of multiple segmented test sub-assemblies 500 coupled together in one or more planes and/or at one or more angles relative to each other, e.g., such as illustrated in the portion of a test system network 700 embodiment illustrated in FIG. 7. Further as illustrated in FIG. 7, plates 502 are optional but may be present to provide structural support for the individual internal conductor segments 581 contained therebetween.

Still referring to FIG. 5, each of conductor segments 581 may be constructed and configured, for example, in a manner using materials, components and features similar to other conductor segments described herein, e.g., including optional leak-off ports 351 and/or internal detachable connections 397 and isolation valves 399 in one or more of the individual segments 581 as shown. In one embodiment, each of conductor segments 581 and plates 502 may be optionally transparent or translucent to allow flow of proppant to be visually monitored during introduction and parallel flow of a proppant-laden test fracture fluid 154 through the multiple conductor segments 581 of assembly 500 in the direction of the arrows. In one embodiment, all of conductor segments 581 of assembly 500 may have the same internal diameter or cross-sectional flow area. In another embodiment, one or more conductor segments 581 of assembly 500 may have different internal diameter or cross-sectional flow area than one or more other conductor segments of assembly 500. For example, cross-sectional flow area of one or more conductor segments 581 that are located at the center of assembly 500 may be larger than cross-sectional flow area of one or more conductor segments 581 that are located at the edges of assembly 500, e.g., to simulate a non-uniform fracture geometry.

In the illustrated embodiment of FIG. 5, a leak-off area 588 is optionally defined for assembly 500 in the area of assembly 500 delineated between the dashed lines, and represents an area in which the internal conductor segments 581 are provided with leak-off ports 351 that may be employed in a manner as previously described herein. As shown, leak-off access apertures 550 are also defined within at least one of plates 502 in locations aligned with and corresponding to the location of leak-off ports 351 defined in conductor segments 581, i.e., to allow access for connection from outside assembly 500 to the leak-off ports 351. Other similar access apertures (not shown) may be defined within at least one of plates 502 for mechanical access to valve stems of valves 597 and/or for routing of control wires to optional valve actuators in an embodiment where valves 597 are automatic valves. Also possible are one or more optional sensors (such as described elsewhere herein) that may be present between plates 502 to monitor or otherwise sense characteristics of fluid and/or proppant at one or more locations within internal conductor segments 581. An input manifold 510 is provided as shown for distributing incoming proppant laden test fluid 154 to the multiple parallel conductor segments 581, and an output manifold 512 is provided for receiving outgoing proppant laden test fluid 154 from the multiple parallel conductor segments 581. Detachable (e.g., internally and/or externally threaded) connection components 397a and 397b, and isolation valves 399 may be provided on input and output sides of assembly 500 as shown to allow for coupling to other conductor segments of a network 300, and/or to provide isolation and analysis of deposited proppant and fluids within assembly 500 as a whole following the test procedure in a manner as previously described.

As further shown in cut-away of FIG. 5, each of the individual internal conductor segments 581 between plates 502 may be itself coupled between input manifold 510 and output manifold 512 with respective isolation valves 599 to allow for removal of each segment 581 together with its isolated contents for analysis after flow testing. As further shown, optional inline isolation valves 599 and connectors 597 may be provided within a given conductor segment 581 to allow isolation and testing of the contents of sections of a given conductor segment 581. Plates 502 may be held together around the internal conductor segments 581 in any suitable manner, e.g., such as using removable bolts, screws or other fasteners 575 or other suitable manner. In the illustrated embodiment, plates 502 may be separated by removing fasteners 575 to access and dissemble internal conductor segments 581, e.g., for analysis of contents 373 after testing. In one exemplary embodiment, solation valves 599 may be remotely controllable valves (e.g., electrical-actuated, hydraulic actuated, pneumatic-actuated, or via manual valve stem extending outside plate/s 502) in order to allow isolation of proppant and fluid contents within individual segments 581 and sub-segments thereof immediately at termination of pumping of a proppant-laden test fracture fluid 154. Relative size (e.g., footprint) and cross-sectional flow area of a segmented fracture test assembly 500 may vary according to the characteristics of a given application.

For purposes of illustration only, in one exemplary embodiment length of test assembly 500 (from inlet manifold 510 to outlet manifold 512) may be about 4 feet, side-to-side width of test assembly 500 (from leftmost conductor segment 581 to rightmost conductor segment 581) may be about 2 feet. and each conductor segment 581 may be cylindrical tubing having an internal diameter of about ¼ inch. However, greater and lesser test assembly widths and/or lengths, as well as greater and lesser values of conductor segment diameter or cross-section flow area are also possible. It is also optionally possible that different conductor segments 581 of the same segmented fracture test assembly 500 may have different internal diameters or cross-sectional flow areas from each other. The number of conductor segments 581 provided between inlet and outlet manifolds of a segmented fracture test assembly with or without plates 502 (e.g., as shown in FIG. 7) may also vary to be greater or lesser than shown in the figures herein. For example, the total number of conductor segments 581 coupled between inlet and outlet manifolds of a segmented fracture test assembly may in one embodiment be two or more conductor segments 581, alternatively may be five or more conductor segments 581, further alternatively may be from 2 to 30 conductor segments 581, further alternatively may be from 5 to 25 conductor segments 581, and further alternatively may be from 10 to 20 conductor segments 581, although the number of conductor segments may also exceed 30 conductor segments 581 for a given segmented fracture test assembly 500.

Figure 6:
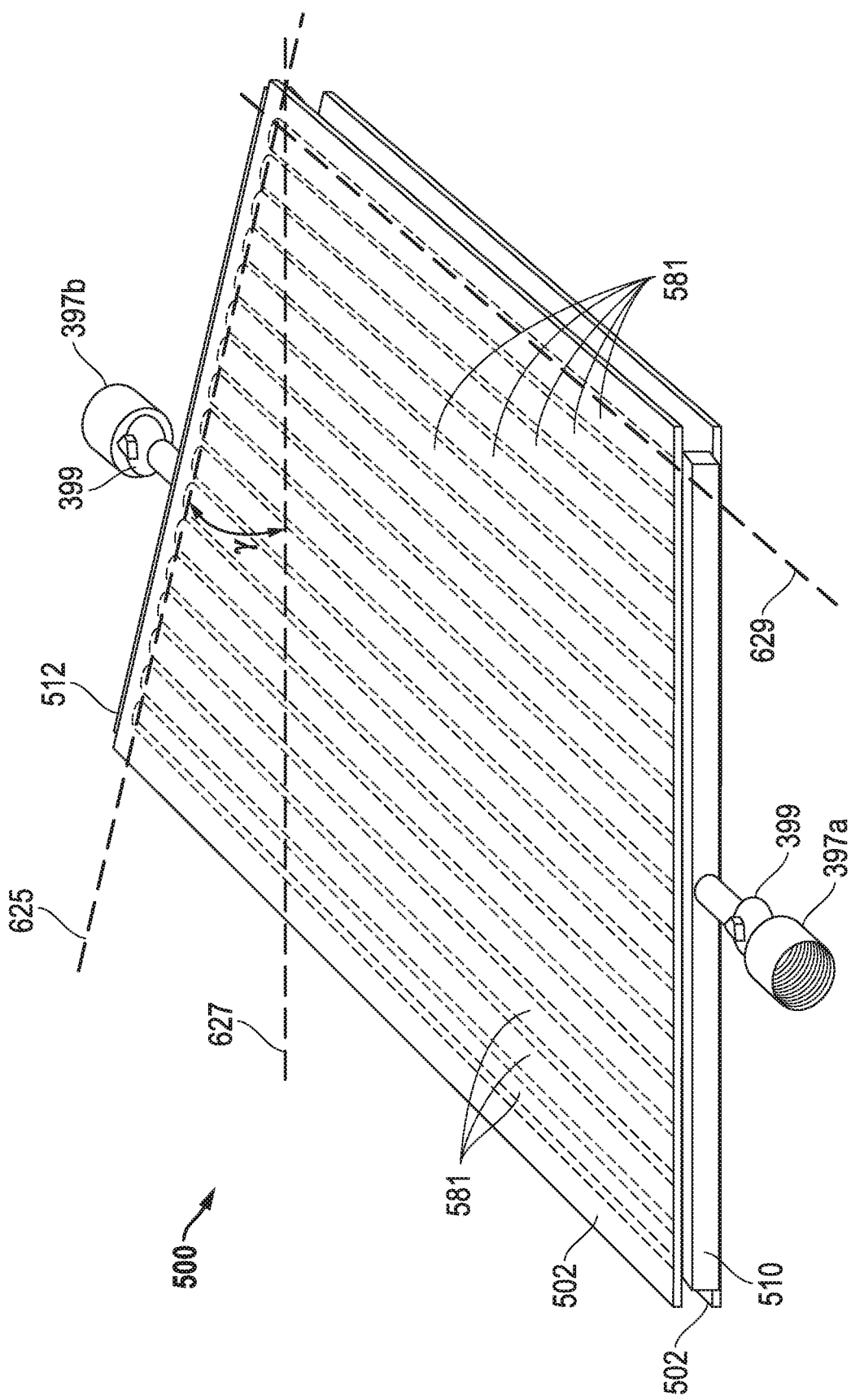
FIG. 6 illustrates a perspective view of a segmented fracture test assembly according to another exemplary embodiment of the disclosed systems and methods.

FIG. 6 illustrates a perspective view of another exemplary embodiment of a segmented fracture test assembly 600 that includes multiple conductor segments 581 that are also contained between two opposing plates 502, and which may in one embodiment have dimensions similar to that described in FIG. 5. However, in this embodiment, no leak-off ports 351 are provided. In the embodiment of FIG. 6, length of individual conductor segments 581 varies in a graded manner from one side to another, so that a line 625 formed by the outlets of conductor segments 581 (and in this case output manifold 512) are oriented at an acute angle γ relative to a line 627 that is perpendicular to the linear axes 629 of the individual conductor segments 581 (and in this case input manifold 510) as shown. Acute angle γ may be any magnitude of angle that is suitable for a given application, but may in one embodiment be from greater than 0° to about 30°, alternatively from greater than 0° to about 15°, and further alternatively from about 15° to about 30°, although values of acute angle γ greater than 30° are also possible. It will be understood in other embodiments the lengths of individual conductor segments 581 may vary so that a line formed by the inlets of conductor segments 581 (and in this case input manifold 510) are also (or alternatively) oriented at an acute angle γ relative to a line that is perpendicular to the linear axes 629 of the individual conductor segments 581.

FIG. 7 illustrates an overhead view of another exemplary embodiment of a portion of a test system network 700 including segmented fracture test assemblies 790 that each may or may not include surrounding plates 502 (e.g., shown in dashed outline). In this embodiment the illustrated segmented test assembly includes multiple test system sub-assemblies 790 of conductor segments 581 disposed between corresponding input and output manifolds 510 and 512 that are coupled together between isolation valves 599 and connectors 597. Each of sub-assemblies 790 may be configured, for example, similar to assemblies 500 or 600 of FIGS. 5 and 6. As shown, each of sub-assemblies may be oriented at different angles to each other, e.g., by virtue of angle manifolds 510 or 512, and/or graded length of conductor segments 581 within a given sub-assembly 790. In the embodiment of FIG. 7, the segmented test assembly is oriented to be within a horizontal plane in order to simulate a planar horizontal fracture that extends laterally from an input conductor segment 652 that is provided to simulate a horizontal wellbore. As shown in FIG. 7, the segmented fracture test assembly of FIG. 7 may form one part of a test system network 700 that may include other test system assemblies or conductor segments that may be coupled to extend from other outputs of input conductor segment 652 as shown. In another embodiment, an entire test system network may be configured from a segmented fracture test assembly that may include multiple sub-assemblies.

It will be understood that one or more of the tasks, functions, or methodologies described herein for an information handling system or component thereof (e.g., including those described herein for components 375, 377 and 379) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a programmable integrated circuit may be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) as may be applicable to perform certain of the operations, tasks, functions, or actions described herein for the disclosed embodiments.

While the invention may be adaptable to various modifications and alternative forms, specific examples and exemplary embodiments have been shown by way of example and described herein. However, it should be understood that the invention is not intended to be limited to the particular forms disclosed. Rather, the invention is to cover all modifications, equivalents, and alternatives falling within the spirit and scope of the methods and systems described herein. Moreover, the different aspects of the disclosed methods and systems may be utilized in various combinations and/or independently. Thus the invention is not limited to only those combinations shown herein, but rather may include other combinations.

What is claimed is:

1. A method, comprising:
    introducing a slurry comprising proppant particles and fluid into at least one fluid inlet of a network comprising multiple conductor segments coupled together in end-to-end fluid communication between the at least one fluid inlet and at least one fluid outlet of the network with a separate sample chamber being defined in each of at least a portion of the multiple conductor segments;
    causing the slurry to flow through the multiple conductor segments from the at least one fluid inlet to at least one fluid outlet of the network to deposit at least a portion of the proppant particles from the slurry within at least a portion of the multiple conductor segments;
    isolating a first portion of the deposited proppant particles as contents of a first one of the sample chambers defined within a first one of the multiple conductor segments, and isolating a second portion of the deposited proppant particles as the contents of a second one of the sample chambers defined within a second one of the multiple conductor segments that is coupled between the first conductor segment and the at least one fluid outlet; and
    removing the isolated first portion of proppant particles from the first sample chamber of the first conductor segment, and removing the isolated second portion of proppant particles from the second sample chamber of the second conductor segment.

2. The method of claim 1, further comprising analyzing the proppant particles removed from the first sample chamber separately from the proppant particles removed from the second sample chamber; and analyzing the proppant particles removed from the second sample chamber separately from proppant particles removed from the first sample chamber.

3. The method of claim 1, further comprising allowing at least a portion of the fluid from the slurry to flow out of the network through at least one leak-off port defined in a body of at least one of the multiple conductor segments while causing the slurry to flow through the multiple conductor segments of the network.

4. The method of claim 1, where at least a portion of the multiple conductor segments are coupled to extend along an upward or downward path relative to gravity;
    and where the method further comprises causing the slurry to flow along the upward or downward path through the multiple conductor segments.

5. The method of claim 4, where at least a portion of the multiple conductor segments are coupled to extend along an angled path having both horizontal and vertical components relative to gravity; and where the method further comprises causing the slurry to flow along the angled path through the multiple conductor segments.

6. The method of claim 1, where the multiple conductor segments comprise:
    an input conductor segment having an inlet and at least one outlet;
    multiple primary conductor segments, each of the primary conductor segments having an outlet and an inlet coupled to the outlet of the input conductor segment; and
    multiple secondary conductor segments, each of the secondary conductor segments having an outlet and an inlet coupled to the outlet of one of the primary conductor segments;
    where the each of the secondary conductor segments has an internal cross-sectional open area that is smaller than an internal cross-sectional area of the primary conductor segment to which it is coupled.

7. The method of claim 6, where the network comprises multiple separate network branches coupled to the input conductor segment outlet, each of the multiple separate network branches having an outlet, an inlet coupled to the outlet of the input conductor segment, and comprising:
    a primary conductor segment having an outlet and an inlet coupled to the outlet of the input conductor segment; and
    at least one secondary conductor segment having an outlet and an inlet coupled to the outlet of the primary conductor segment of the same network branch; and
    where each of the secondary conductor segments has an internal cross-sectional open area that is smaller than an internal cross-sectional area of the primary conductor segment to which it is coupled; and where the causing the slurry to flow through the multiple conductor segments comprises causing the slurry to flow simultaneously through the multiple conductor segments of each of the network branches.

8. The method of claim 7, further comprising measuring a flow rate of the flowing fluid of at least one network branch while causing the slurry to flow through the multiple conductor segments of the network.

9. The method of claim 7, further comprising using at least one sensor to monitor one or more characteristics of the slurry between the inlet and outlet of at least one network branch while causing the slurry to flow through the multiple conductor segments of the network.

10. The method of claim 7, where each of the multiple separate network branches comprises multiple cylindrical conductor segments coupled together in end-to-end relationship; and where internal diameters of the multiple cylindrical conductor segments of each network branch become progressively smaller from the inlet of each network branch to the outlet of each network branch.

11. The method of claim 6, where the network comprises at least one network branch comprising: a primary conductor segment having an outlet and an inlet coupled to an outlet of the input conductor segment, and at least one arm section of the network branch that includes at least one additional conductor segment having an outlet and having an inlet coupled to the outlet of the primary conductor segment of the same network branch; and where the method further comprises simultaneously measuring a flow rate of slurry through the at least one arm section while measuring a pressure drop between an upstream point and a downstream point of the arm section while causing the slurry to flow through the multiple conductor segments of the network.

12. The method of claim 1, where the network of multiple conductor segments further comprises multiple conductor segments of a sub-assembly, the sub-assembly comprising:
an outlet manifold; and
an inlet manifold coupled to an outlet of one of the multiple conductor segments of the network that is other than one of the multiple sub-assembly conductor segments; and
where the multiple sub-assembly conductor segments are coupled together in parallel side-by-side relationship between the inlet manifold and the outlet manifold; and
where the causing comprises causing the slurry to flow simultaneously in the same direction through the multiple sub-assembly conductor segments.

13. The method of claim 12, where each of the multiple sub-assembly conductor elements is a linear cylindrical conductor having an internal radius; where the multiple sub-assembly conductor segments are coupled together in parallel side-by-side relationship within the same plane; and where the multiple sub-assembly conductor segments are coupled together at a distance from each other that is smaller than the internal radius of each of the multiple sub-assembly conductor elements.

14. The method of claim 13, where the sub-assembly further comprises two planar plates disposed in parallel relationship to the plane of the multiple sub-assembly conductor segments; and where the multiple sub-assembly conductor segments are coupled together in parallel side-by-side relationship between the two plates.

15. The method of claim 13, where each of the multiple sub-assembly conductor segments has an inlet and an outlet; where the inlets of all of the multiple sub-assembly conductor segments are aligned with each other in a first line; where the outlets of all of the multiple sub-assembly conductor segments are aligned with each other in a second line; and where a length of individual conductor segments of the multiple sub-assembly conductor segments varies in a graded manner from one side of the sub-assembly to the other side of the sub-assembly so that at least one of the first line or second line is oriented at an acute angle to the orientation of the linear axes of the multiple parallel sub-assembly conductor segments.

16. The method of claim 12, where each of the multiple sub-assembly conductor elements is a cylindrical conductor that has the same internal diameter as all the other multiple sub-assembly conductor elements; and where the multiple sub-assembly conductor segments of the sub-assembly are coupled together at a distance from each other that is smaller than an internal radius of each of the multiple sub-assembly conductor elements of the sub-assembly.

17. The method of claim 12, where one or more of the multiple sub-assembly conductor segments has opposing first and second ends; where at least one of the multiple sub-assembly conductor segments has at least one leak-off port defined in a body of the sub-assembly conductor segment between the inlet manifold and the outlet manifold; and where the method further comprises allowing at least a portion of a fluid from the slurry to flow out of the sub-assembly through the at least one leak-off port while causing the slurry to flow simultaneously through the multiple sub-assembly conductor segments.

18. The method of claim 1, where the inlet of the input conductor segment is defined at a first end of the input conductor segment, and the outlet of the input conductor segment is defined at a second end of the input conductor segment; where at least a linear portion of the input conductor segment that is contiguous with the outlet of the input conductor segment is oriented horizontal relative to gravity; and where at least a portion of the multiple conductor segments are coupled to extend outward in a horizontal direction relative to gravity from the outlet of the input conductor segment.

19. The method of claim 1, further comprising configuring the network comprising multiple conductor segments to model a natural fracture network of an underground formation prior to the introducing.

20. The method of claim 1, where the proppant particles of the slurry comprise at least one of sand, sintered bauxite, ceramic proppant, or resin coated proppant.

21. The method of claim 1, where the fluid of the slurry comprises a liquid.

22. The method of claim 1, where the multiple conductor segments define multiple respective separate sample chambers coupled together in series between the at least one fluid inlet and the at least one fluid outlet in respective positions that vary in distance from the at least one fluid inlet; and where:
the causing comprises:
pumping the slurry into the at least one fluid inlet to cause the slurry to flow into the network from the fluid inlet and sequentially through the multiple respective separate sample chambers to form a simulated proppant pack of deposited proppant particles within the at least a portion of the multiple conductor segments, a different portion of the deposited proppant particles of the simulated proppant pack being deposited within each of the multiple respective separate sample chambers, and
then stopping the pumping of the slurry into the fluid inlet;

the isolating comprises then isolating the different portions of the deposited proppant particles of the simulate proppant pack as the contents of the multiple respective separate sample chambers, each of the different isolated portions of the deposited proppant particles being deposited in a separate respective sample chamber positioned at a different distance from the fluid inlet than the position of each other of the separate sample chambers;

the removing comprises then removing the different isolated portions of deposited proppant particles of the simulated proppant pack from the multiple respective separate sample chambers; and where the method further comprises then analyzing the different isolated portions of the deposited proppant particles of the simulated proppant pack removed from the multiple respective separate sample chambers.

23. The method of claim 22, where the different isolated portions of the deposited proppant particles of the simulated proppant pack are different portions of the simulated proppant pack that are located at respective different distances from the at least one fluid inlet; and where the analyzing comprises analyzing at least one proppant pack characteristic of each of the different isolated portions of the simulated proppant pack.

24. The method of claim 23, where the analyzed proppant pack characteristic comprises particle size distribution of each of the different isolated portions of the simulated proppant pack.

25. The method of claim 23, where the analyzed proppant pack characteristic comprises proppant volume or mass within each of the different isolated portions of the simulated proppant pack.

26. The method of claim 23, further comprising listing the analyzed proppant pack characteristic of each of the different portions of the simulated proppant pack starting from analyzed proppant pack characteristic of an initial portion of the simulated proppant pack that is nearest to the at least one fluid inlet to analyzed proppant pack characteristic of a last portion of the simulated proppant pack that is furthest from the at least one fluid inlet.

27. The method of claim 1, further comprising detaching and disassembling the first and second conductor segments from the other conductor segments, the disassembled first conductor segment including the first sample chamber containing the isolated first portion of the deposited proppant particles, and the disassembled second conductor segment including the second sample chamber containing the isolated second portion of the deposited proppant particles.

28. The method of claim 1, where the first one of the multiple sample chambers is positioned nearer to the at least one fluid inlet than the second one of the multiple sample chambers.

29. The method of claim 1, further comprising analyzing the proppant particles removed from the first sample chamber separately from the proppant particles removed from the second sample chamber; and analyzing the proppant particles removed from the second sample chamber separately from proppant particles removed from the first sample chamber.

30. The method of claim 1, where at least a portion of the multiple conductor segments of the network are coupled together sequentially in end-to-end relationship between the fluid inlet and at least one of the fluid outlets.

31. A method, comprising:
introducing a test fluid into at least one fluid inlet of a network of multiple conductor segments coupled together in fluid communication, the test fluid including one or more constituents;
causing the test fluid to flow through the multiple conductor segments from the fluid inlet to multiple fluid outlets of the network to distribute one or more of the constituents of the test fluid within the multiple conductor segments;
isolating contents of a sample chamber defined within at least one of the multiple conductor segments, the isolated contents including distributed test fluid constituents;
detaching the at least one conductor segment from fluid communication with the other conductor segments, the detached conductor segment including the sample chamber containing the isolated contents; and
removing the isolated contents from the sample chamber of the detached conductor segment;
where the multiple conductor segments comprise:
an input conductor segment having an inlet and at least one outlet,
multiple primary conductor segments, each of the primary conductor segments having an outlet and an inlet coupled to the outlet of the input conductor segment, and
multiple secondary conductor segments, each of the secondary conductor segments having an outlet and an inlet coupled to the outlet of one of the primary conductor segments,
where the each of the secondary conductor segments has an internal cross-sectional open area that is smaller than an internal cross-sectional area of the primary conductor segment to which it is coupled;
where the network comprises at least one network branch comprising: a primary conductor segment having an outlet and an inlet coupled to an outlet of the input conductor segment, and at least one arm section of the network branch that includes at least one additional conductor segment having an outlet and having an inlet coupled to the outlet of the primary conductor segment of the same network branch; and
where the method further comprises simultaneously measuring a flow rate of test fluid through the at least one arm section while measuring a pressure drop between an upstream point and a downstream point of the arm section while causing the test fluid to flow through the multiple conductor segments of the network.

32. A method, comprising:
introducing a test fluid into at least one fluid inlet of a network of multiple conductor segments coupled together in fluid communication, the test fluid including one or more constituents;
causing the test fluid to flow through the multiple conductor segments from the fluid inlet to multiple fluid outlets of the network to distribute one or more of the constituents of the test fluid within the multiple conductor segments;
isolating contents of a sample chamber defined within at least one of the multiple conductor segments, the isolated contents including distributed test fluid constituents; and
removing the isolated contents from the sample chamber of the detached conductor segment;
where the multiple conductor segments comprise:
an input conductor segment having an inlet and at least one outlet, multiple primary conductor segments, each of the primary conductor segments having an outlet and an inlet coupled to the outlet of the input conductor segment, and multiple secondary conductor segments, each of the secondary conductor segments having an outlet and an inlet coupled to the outlet of one of the primary conductor segments, where the each of the secondary conductor segments has an internal cross-sectional open area that is smaller than an internal cross-sectional area of the primary conductor segment to which it is coupled.

33. The method of claim 32, further comprising detaching and disassembling the at least one conductor segment from the other conductor segments prior to the removing, the disassembled conductor segment including the sample chamber containing the isolated contents.

\* \* \* \* \*